US011219008B2

United States Patent
Oh et al.

(10) Patent No.: US 11,219,008 B2
(45) Date of Patent: Jan. 4, 2022

(54) METHODS AND APPARATUS FOR GUARDBAND CONFIGURATION

(71) Applicant: Samsung Electronics Co., Ltd., Suwon-si (KR)

(72) Inventors: Jinyoung Oh, Suwon-si (KR); Hyunseok Ryu, Suwon-si (KR); Sungjin Park, Suwon-si (KR); Jonghyun Bang, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 16/680,369

(22) Filed: Nov. 11, 2019

(65) Prior Publication Data

US 2020/0154415 A1 May 14, 2020

(30) Foreign Application Priority Data

Nov. 9, 2018 (KR) .......................... 10-2018-0137126
Oct. 17, 2019 (KR) .......................... 10-2019-0129351

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/1819* (2013.01); *H04L 5/001* (2013.01);
(Continued)

(58) Field of Classification Search
CPC ........... H04W 72/042; H04W 72/0453; H04W 56/001; H04W 74/0808; H04L 5/0055;
(Continued)

(56) References Cited

U.S. PATENT DOCUMENTS 10,511,411 B2 * 12/2019 Han ..................... H04L 5/0064
2019/0387508 A1 12/2019 Park et al.
(Continued)

FOREIGN PATENT DOCUMENTS

| WO | 2018/084676 A1 | 5/2018 |
| WO | 2018/137181 A1 | 8/2018 |
| WO | 2018/151565 A1 | 8/2018 |

OTHER PUBLICATIONS

Samsung, "Channel access procedures for NR-U", 3GPP TSG-RAN WG1 Meeting #94bis, Oct. 8-12, 2018, R1-1810860, 9 pages.
(Continued)

*Primary Examiner* — Omar J Ghowrwal

(57) ABSTRACT

A base station and a terminal that perform communication using an unlicensed band may divide a bandwidth part into a plurality of subbands and may perform a channel access procedure for the respective subbands. The terminal receives, from the base station, configuration information via radio resource control (RRC) signaling. The terminal identifies whether information on a guardband is included in the configuration information. The base station transmits control information including bitmap information indicating an available resource block (RB) set among RB sets, wherein the RB sets are determined based on the information on the guardband based on the information on the guardband is included in the configuration information. The base station also transmits data based on the bitmap information.

20 Claims, 19 Drawing Sheets

(51) Int. Cl.
  *H04W 56/00* (2009.01)
  *H04L 1/18* (2006.01)
  *H04W 74/08* (2009.01)

(52) U.S. Cl.
  CPC .......... *H04L 5/0055* (2013.01); *H04L 5/0092* (2013.01); *H04W 56/001* (2013.01); *H04W 72/0453* (2013.01); *H04W 74/0808* (2013.01); *H04L 1/1854* (2013.01); *H04L 1/1887* (2013.01)

(58) Field of Classification Search
  CPC ... H04L 1/1819; H04L 5/0092; H04L 1/1854; H04L 1/1887; H04L 5/001; H04L 5/0044
  See application file for complete search history.

(56) References Cited

U.S. PATENT DOCUMENTS

| | | | |
|---|---|---|---|
| 2019/0387519 A1 | 12/2019 | Wang et al. | |
| 2020/0022148 A1* | 1/2020 | Tang | H04W 72/0453 |
| 2020/0059930 A1 | 2/2020 | Lee et al. | |
| 2020/0092864 A1* | 3/2020 | Chen | H04W 48/08 |
| 2020/0236710 A1* | 7/2020 | Sun | H04W 74/0808 |
| 2020/0344034 A1* | 10/2020 | Moon | H04L 5/0092 |
| 2021/0058927 A1* | 2/2021 | Zhou | H04W 28/08 |

OTHER PUBLICATIONS

MediaTek Inc., "Discussion on NR-U configured grant", 3GPP TSG RAN WG1 Meeting #95, Nov. 12-16, 2018, R1-1812359, 3 pages.
Oppo, "Considerations on UL signals and channels for NR-U", 3GPP TSG RAN WG1 Meeting #95, Nov. 12-16, 2018, R1-1812800, 4 pages.
Huawei, HiSilicon, "Transmission with configured grant in NR unlicensed band", 3GPP TSG RAN WG1 Meeting #95, Nov. 12-16, 2018, R1-1812197, 9 pages.
International Search Report dated Feb. 19, 2020 in connection with International Patent Application No. PCT/KR2019/015265, 3 pages.
Supplementary European Search Report dated Nov. 9, 2021 in connection with European Patent Application No. 19 88 2105, 10 pages.

* cited by examiner

METHODS AND APPARATUS FOR GUARDBAND CONFIGURATION

CROSS-REFERENCE TO RELATED APPLICATIONS

This application is based on and claims priority under 35 U.S.C. 119 to Korean Patent Application No. 10-2018-0137126 filed on Nov. 9, 2018 and Korean Patent Application No. 10-2019-0129351 filed on Oct. 17, 2019 in the Korean Intellectual Property Office, the disclosures of which are herein incorporated by reference in their entireties.

BACKGROUND

1. Field

The disclosure relates to a wireless communication system, and more particularly, to a method and an apparatus for channel access in a wireless communication system.

2. Description of Related Art

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System."

Implementation of the 5G communication system in ultra-high frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems.

In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by beamforming, MIMO, and array antenna techniques, which correspond to 5G communication technology. Application of a cloud radio access network (cloud RAN) as the above-described big data processing technology may also be considered to be an example of convergence between the 5G technology and the IoT technology.

Further, with the development of the wireless communication system, various services can be provided, and thus there has been a need for schemes to smoothly provide such services.

SUMMARY

Based on the above-described discussions, the disclosure provides a method and an apparatus for channel access in a wireless communication system.

Various embodiments of the disclosure provide an apparatus and a method for performing a channel access procedure in an unlicensed band.

Various embodiments of the disclosure provide an apparatus and a method for performing a channel access procedure with respect to each subband of a bandwidth part in an unlicensed band.

According to the disclosure to solve the above-described problem, a method by a terminal includes receiving configuration information of a bandwidth part from a base station; receiving subband configuration information from the base station; receiving control information including a result of a channel access procedure performed for each subband and resource allocation information; and receiving data based on the result of the channel access procedure and the resource allocation information.

According to the disclosure to solve the above-described problem, a method by a base station includes transmitting configuration information of a bandwidth part to a terminal; transmitting subband configuration information to the terminal; transmitting control information including a result of a channel access procedure performed for each subband and resource allocation information; and transmitting data based on the result of the channel access procedure and the resource allocation information.

According to the disclosure to solve the above-described problem, a terminal includes a transceiver; and a controller configured to: receive configuration information of a bandwidth part from a base station, receive subband configuration information from the base station, receive control information including a result of a channel access procedure performed for each subband and resource allocation information, and receive data based on the result of the channel access procedure and the resource allocation information.

According to the disclosure to solve the above-described problem, a base station includes a transceiver; and a controller configured to: transmit configuration information of a bandwidth part to a terminal, transmit subband configuration information to the terminal, transmit control information including a result of a channel access procedure performed for each subband and resource allocation information, and transmit data based on the result of the channel access procedure and the resource allocation information.

According to various embodiments of the disclosure, a method for operating a base station in a wireless communication system includes transmitting, to a terminal, configuration information including configuration of a bandwidth part in an unlicensed band; dividing the bandwidth part into subbands for performing a channel access procedure; configuring frequency bands for the respective subbands; transmitting configuration information for the subbands to the terminal; and performing the channel access procedure for the respective subbands.

According to various embodiments of the disclosure, a method for operating a terminal in a wireless communication system includes receiving, from a base station, configuration information including configuration of a bandwidth part in an unlicensed band; receiving, from the base station, subband configuration information for performing a channel access procedure for the bandwidth part; receiving, from the base station, DCI for scheduling uplink/downlink data channel transmission and reception; performing the channel access procedure for respective subbands; and performing the uplink data channel transmission and reception in accordance with the result of the channel access procedure.

According to various embodiments of the disclosure, a base station device in a wireless communication system includes a communicator; and a controller configured to control the communicator, wherein the controller is configured to: transmit, to a terminal, configuration information including configuration of a bandwidth part in an unlicensed band and performing of a channel access procedure, perform the channel access procedure for respective subbands included in the bandwidth part, to start a channel access through at least one of the subbands that is determined as an idle channel in accordance with the result of the channel access procedure, and transmit a data channel to the terminal in accordance with the result of the channel access procedure for the respective subbands.

According to various embodiments of the disclosure, a terminal device in a wireless communication system includes a communicator; and a controller configured to control the communicator, wherein the controller is configured to: receive, from a base station, configuration information including configuration of a bandwidth part in an unlicensed band, receive, from the base station, a channel access result for respective subbands of the bandwidth part, receive, from the base station, DCI for scheduling uplink/downlink data channel transmission and reception, and perform the uplink data channel transmission and reception in accordance with the scheduling.

According to the apparatus and the method according to various embodiments of the disclosure, because the base station performs the channel access procedure for the respective subbands of the bandwidth part in the unlicensed band for the communication with the terminal, the communication can be effectively performed in the unlicensed band.

Effects that can be obtained in the disclosure are not limited to the above-described effects, and other unmentioned effects can be clearly understood by those of ordinary skill in the art to which the disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
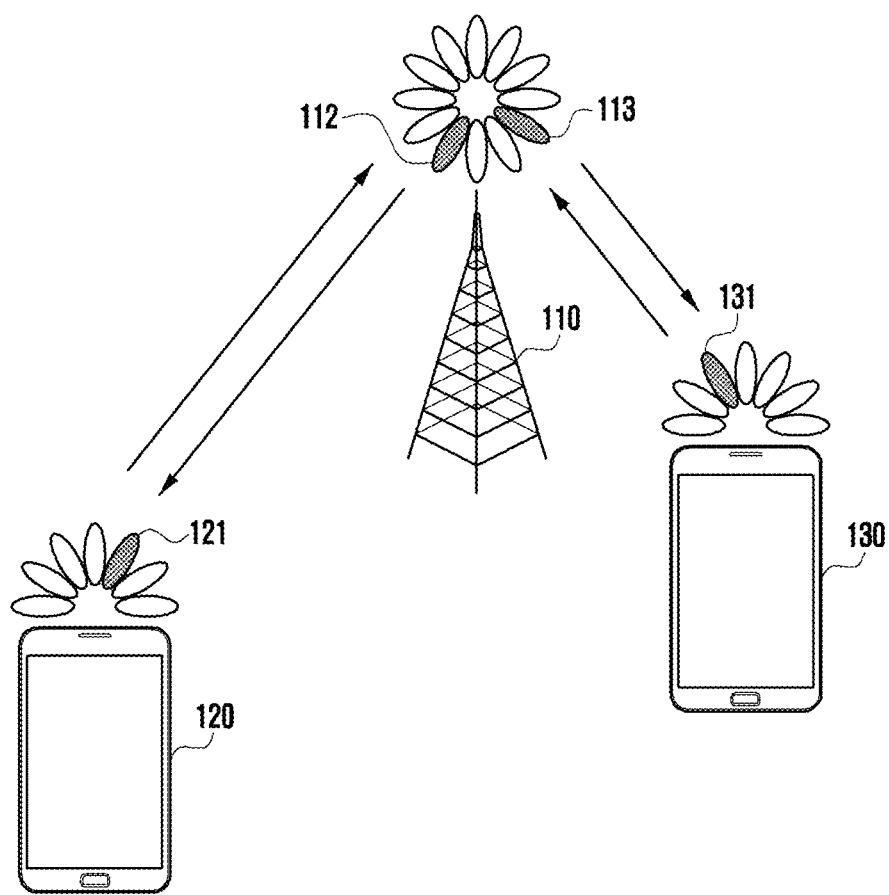
FIG. 1 illustrates a diagram of a wireless communication system according to various embodiments of the disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. In describing the disclosure, related well-known functions or configurations incorporated herein are not described in detail in the case where it is determined that they obscure the subject matter of the disclosure in unnecessary detail. Further, terms to be described later are terms defined in consideration of their functions in the disclosure, but they may differ depending on intentions of a user and an operator or customs. Accordingly, they should be defined based on the contents of the whole description of the disclosure.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

Hereinafter, embodiments of the disclosure will be described in detail with reference to the accompanying drawings.

In explaining the embodiments, explanation of technical contents that are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "unit", as used in an embodiment, means, but is not limited to, a software or hardware component, such as FPGA or ASIC, which performs certain tasks. However, "~unit" is not meant to be limited to software or hardware. The term "unit" may advantageously be configured to reside on the addressable storage medium and configured to execute on one or more processors. Thus, "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units". Further, the components and "units" may be implemented to operate one or more CPUs in a device or a security multimedia card. Further, in an embodiment, "unit" may include one or more processors.

In the 5th generation (5G) system, as compared with the existing 4th generation (4G) system, support for various services is under consideration. For example, services of the 5G system may include an enhanced mobile broadband (eMBB), ultra-reliable and low latency communication (URLLC), a massive machine type communication (mMTC), and an evolved multimedia broadcast/multicast service (eMBMS). The above-described services of the 5G system are exemplary, and possible services of the 5G system are not limited to the above-described examples. Further, the system that provides the URLLC service may be called the URLLC system, and the system that provides the eMBB service may be called the eMBB system. Further, the terms "service" and "system" may be used in an exchangeable or interchangeable manner.

In the communication system as described above, a plurality of services may be provided to a user, and in order to provide the plurality of services to the user, there is a need for a method capable of providing the respective services in the same duration to suit their features and an apparatus using the method.

On the other hand, in a wireless communication system, for example, in a long term evolution (LTE) or LTE-advanced (LTE-A) system or a 5G new radio (NR) system, it may be configured that a base station transmits downlink control information (DCI) including resource allocation information for transmitting a downlink signal to a terminal through a physical downlink control channel (PDCCH), and the terminal receives at least one downlink signal of downlink control information (e.g., channel-state information reference signal (CSI-RS)), a physical broadcast channel (PBCH), or a physical downlink shared channel (PDSCH).

For example, the base station may transmit the downlink control information (DCI) instructing the terminal to receive the PDSCH through the PDCCH in subframe n, and the terminal having received the downlink control information (DCI) may receive the PDSCH in subframe n in accordance with the received downlink control information.

Further, in an LTE, LTE-A, or NR system, the base station may be configured to transmit the downlink control information (DCI) including uplink resource allocation information to the terminal through the downlink control channel (PDCCH), and thus the terminal may transmit, to the base station, at least one uplink signal of uplink control information (e.g., sounding reference signal (SRS), uplink control information (UCI), physical random access channel (PRACH), or physical uplink shared channel (PUSCH).

For example, the terminal, having received the configuration information for transmitting an uplink transmitted from the base station through the PDCCH (or DCI or UL grant including resource allocation information for transmitting the uplink) in subframe n, may perform uplink data channel transmission (hereinafter, PUSCH transmission) in accordance with a predefined time (e.g., n+4), time configured through a higher signal (e.g., n+k), or transmission time indicator information (e.g., n+k) of an uplink signal included in the configuration information for the uplink transmission.

If the configured downlink is transmitted from the base station to the terminal through an unlicensed band (spectrum), or if the configured uplink is transmitted from the terminal to the base station through the unlicensed band, a communication device (e.g., base station or terminal) may perform a channel access procedure (or listen-before talk (LBT) for the unlicensed band in which signal transmission is configured before or just before the configured signal transmission start time, and if it is determined that the unlicensed band is in an idle state in accordance with the result of the channel access procedure, the communication device may perform the configured signal transmission by accessing the unlicensed band. As described above, according to various embodiments, the channel access procedure or the LBT may include a procedure in which the terminal or the base station identify whether the channel of the unlicensed band is in an idle state or in an occupied state.

If it is determined that the unlicensed band is not in an idle state in accordance with the channel access procedure performed by the communication device, or if it is determined that the unlicensed band is in an occupied state, the communication device is unable to access the unlicensed band, and thus it may be unable to transmit the configured signal. In the channel access procedure in the unlicensed band in which the signal transmission is configured, the communication device may receive the signal in the unlicensed band for a predetermined time or a time calculated in accordance with a predefined rule (e.g., for a time calculated through one random value selected by at least the base station or the terminal), and it may determine the idle state of the unlicensed band by comparing the strength of the received signal with a predefined threshold value or a threshold value calculated in accordance with a function that is expressed as at least one variable among a signal bandwidth in which the channel bandwidth or the signal intended to be transmitted is transmitted, the strength of a transmission power, and a beam width of the transmitted signal.

For example, if the strength of the signal that is received by the communication device for 25 μs in the unlicensed band is lower than the predefined threshold value of −72 dBm, the communication device may determine that the unlicensed band is in an idle state, and it may perform the signal transmission configured in the unlicensed band. In this case, the maximum possible signal transmission time may be limited in accordance with the maximum channel occupancy time defined for each country or area in the unlicensed band or the kind of the communication device (e.g., base station or terminal, or master or slave). For example, in the case of Japan, in the 5 GHz unlicensed band, a base station or a terminal may occupy a channel in an idle state through performing of a channel access procedure, and then it may occupy the channel without performing an additional channel access procedure for the maximum time of 4 ms to transmit a signal. If the strength of the signal that is received for 25 μs is higher than the predefined threshold value of −72 dBm, the communication device may determine that the unlicensed band is not in the idle state, and it may not transmit the signal.

In the case of a 5G communication system, in order to provide various services and to support high data rate, various technologies, such as retransmission in the unit of a code block group (CBG) and technology capable of transmitting an uplink signal without uplink scheduling information (e.g., grant-free uplink transmission), will be introduced. Accordingly, in the case of performing 5G communication through the unlicensed band, a more efficient channel access procedure in consideration of various variables is necessary.

A wireless communication system was initially developed for the purpose of providing a voice-oriented service, but it has been expanded to, for example, a broadband wireless communication system that provides a high-speed and high-quality packet data service together with the communication standards, such as 3GPP high speed packet access (HSPA), long term evolution (LTE) or evolved universal terrestrial radio access (E-UTRA), LTE-Advanced (LTE-A), 3GPP2 high rate packet data (HRPD), ultra-mobile broadband (UMB), and IEEE 802.16e. Also, for the 5th generation wireless communication system, 5G or new radio (NR) communication standards have been developed.

In the wireless communication system including the 5th generation as described above, at least one service of enhanced mobile broadband (eMBB), massive machine type communications (mMTC), or ultra-reliable and low-latency communications (URLLC) may be provided to a terminal. The above-described services may be provided to the same terminal in the same duration. In an embodiment, the eMBB may be aimed at high-speed transmission of high-capacity data, the mMTC may be aimed at minimization of a terminal power and accesses of a plurality of terminals, and URLLC may be aimed at high reliability and low latency, but they are not limited thereto. The three kinds of services as described above may be primary scenarios in an LTE system or post-LTE 5G/new radio or next radio (NR) system, but they are not limited to the above-described examples.

Hereinafter, the base station may be the subject that performs resource allocation for the terminal, and it may include at least one of an eNode B, Node B, base station (BS), radio access unit, base station controller, or node on a network. The terminal may include at least one of user equipment (UE), a mobile station (MS), a cellular phone, a smart phone, a computer, or a multimedia system capable of performing a communication function. In the disclosure, a downlink (DL) is a radio transmission path of a signal that is transmitted from the base station to the terminal, and an uplink (UL) means a radio transmission path of a signal that is transmitted from the terminal to the base station. Hereinafter, an LTE or LTE-A system is exemplified in describing an embodiment of the disclosure, and in order to describe a method and an apparatus proposed in the disclosure, the terms "physical channel" and "signal" in the LTE or LTE-A system in the related art may be used. It may be possible to apply an embodiment of the disclosure to other communication systems having similar technical backgrounds or channel types. For example, the 5th generation mobile communication technology (5G, new radio, or NR) that is developed after LTE-A may be included therein. Further, an embodiment of the disclosure may also be applied to other communication systems through partial modifications thereof in a range that does not greatly deviate from the scope of the disclosure by the judgment of those skilled in the art.

In the NR system that is a representative example of broadband wireless communication systems, the downlink (DL) adopts an orthogonal frequency division multiplexing (OFDM) scheme, and the uplink (UL) adopts both the OFDM and single carrier frequency division multiple access (SC-FDMA) schemes. According to multiple access schemes, data of respective users or control information can be discriminated from each other by allocating and operating time-frequency resources for transmitting the user data or control information so that the time-frequency resources do not overlap each other, that is, to establish orthogonality.

The NR system adopts a hybrid automatic repeat request (HARQ) scheme in which a physical layer retransmits the corresponding data if a decoding failure occurs during an initial transmission. According to the HARQ scheme, a receiver may transmit information (negative acknowledgement (NACK)) for notifying a transmitter of the decoding failure if the receiver has not accurately decoded the data, and the transmitter may make a physical layer retransmit the corresponding data. The receiver may combine the data that is retransmitted from the transmitter with the previous data of which the decoding has failed to heighten the data reception performance. Further, if the receiver has accurately decoded the data, the HARQ scheme may transmit information (acknowledgement (ACK)) for notifying of a decoding success to the transmitter, so that the transmitter can transmit new data.

Hereinafter, a method and an apparatus for allocating radio resources in an unlicensed band according to the disclosure will be described. More specifically, the disclosure provides a method and an apparatus for dividing a broadband frequency band into subbands, performing a channel access procedure with respect to the respective subbands, and transmitting a downlink or uplink signal through the whole or partial subbands that are determined to be in an idle state if the whole or partial subbands are determined to be in the idle state as the result of the channel access procedure in a wireless communication system, and in particular, in a system including a node receiving the downlink signal using the broadband frequency in the unlicensed band or a node intending to transmit the uplink signal. In this case, a base station or a terminal transmitting the signal may transmit, to the terminal or the base station, information on the subbands that are determined to be in the idle state through the channel access procedure among the broadband frequency band, for example, the result of the channel access procedure for the respective subbands, and the terminal or the base station having received the information may correctly receive the downlink or uplink signal using the result of the channel access procedure.

The terms used in the following description to call signals, channels, control information, network entities, and constituent elements of devices are exemplary for convenience in explanation. Accordingly, the disclosure is not limited to the terms to be described later, but other terms having equal technical meanings may also be used.

Further, although various embodiments of the disclosure will be described using the terms used in some communication standards (e.g., 3rd Generation Partnership Project (3GPP)), they are merely exemplary. The various embodiments of the disclosure may be easily modified and applied to other communication systems.

FIG. 1 illustrates a diagram of a wireless communication system according to various embodiments of the disclosure. FIG. 1 exemplifies a base station 110, a terminal 120, and a terminal 130 as parts of nodes using radio channels in a wireless communication system. Although FIG. 1 illustrates only one base station, this is merely one embodiment, and other base stations that are equal or similar to the base station 110 may be further included in the communication system of the disclosure.

The base station 110 is a network infrastructure that provides radio accesses to the terminals 120 and 130. The base station 110 has a coverage that is defined as a specific geometric area based on a distance in which the base station can transmit a signal. The base station 110 may be called an access point (AP), eNodeB (eNB), gNodeB (gNB), 5th generation node (5G node), wireless point, transmission/reception point (TRP), or other terms having equal technical meanings in addition to the base station.

The terminals 120 and 130 are devices used by users, and they perform communication with the base station 110 on radio channels. According to circumstances, at least one of the terminals 120 and 130 may be operated without user's participation. That is, at least one of the terminals 120 and 130 may be a device that performs machine type communication (MTC), and it may not be carried by the user. Each of the terminals 120 and 130 may be called user equipment (UE), mobile station, subscriber station, remote terminal, or other terms having equal technical meanings in addition to the terminal.

The base station 110 and the terminals 120 and 130 may transmit and receive radio signals in mmWave bands (e.g., 28 GHz, 30 GHz, 38 GHz, and 60 GHz). In this case, for the improvement of a channel gain, the base station 110 and the terminals 120 and 130 may perform beamforming. Here, the beamforming may include transmission beamforming and reception beamforming. That is, the base station 110 and the terminals 120 and 130 may give directivity to the transmitted signal or the received signal. For this, the base station 110 and the terminals 120 and 130 may select serving beams 112, 113, 121, and 131 through a beam search or beam management procedure. After the serving beams 112, 113, 121, and 131 are selected, the subsequent communication may be performed through resources that are in a quasi-co-located (QCL) relationship with resources having transmitted the serving beams 112, 113, 121, and 131.

Figure 2:
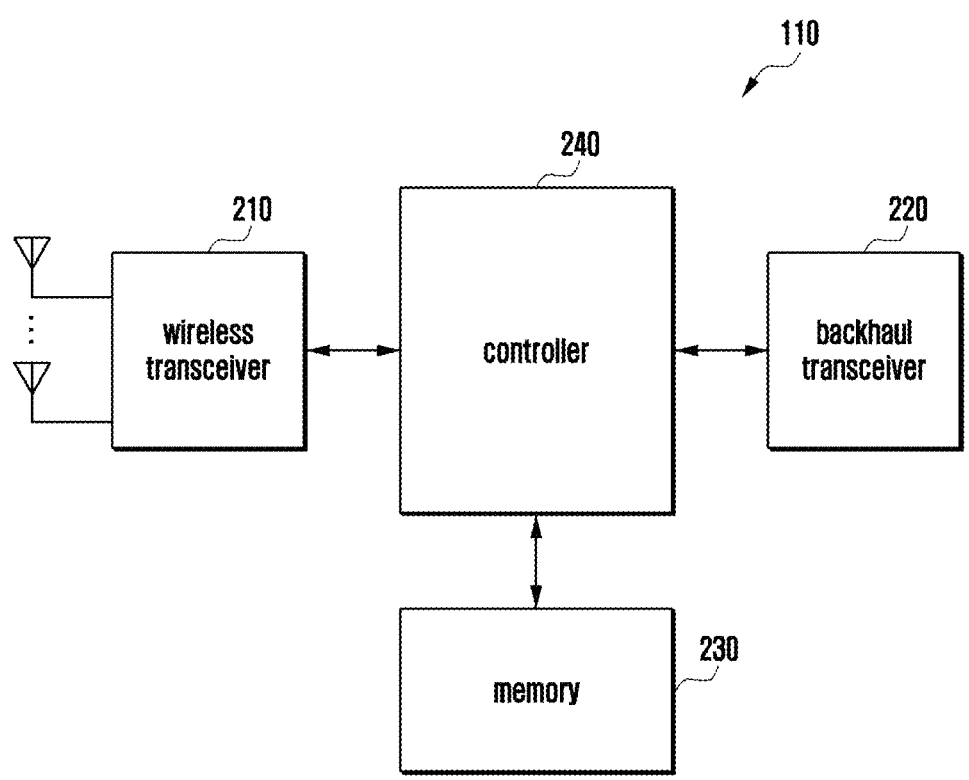
FIG. 2 illustrates a diagram of the configuration of a base station in a wireless communication system according to various embodiments of the disclosure.

FIG. 2 illustrates a diagram of the configuration of a base station in a wireless communication system according to various embodiments of the disclosure. The configuration exemplified in FIG. 2 may be understood as the configuration of the base station 110. The term "~ unit" or "~or (~er)" as used hereinafter may mean a unit for processing at least one function or operation, and it may be implemented by hardware, software, or a combination of hardware and software.

With reference to FIG. 2, the base station may include a wireless transceiver 210, a backhaul transceiver 220, a memory 230, and a controller 240.

The wireless transceiver 210 may perform functions for transmitting and receiving a signal on a radio channel. For example, the wireless transceiver 210 performs conversion between a baseband signal and a bit string in accordance with the physical layer standard of the system. For example, during data transmission, the wireless transceiver 210 encodes and modulates the transmitted bit string to generate complex symbols. Further, during data reception, the wireless transceiver 210 demodulates and decodes the baseband signal to restore the received bit string.

Further, the wireless transceiver 210 may up-converts the baseband signal into a radio frequency (RF) band signal to transmit the RF band signal through an antenna, and it may down-converts the RF band signal that is received through the antenna into a baseband signal. For this, the wireless transceiver 210 may include at least one of a transmission filter, a reception filter, an amplifier, a mixer, an oscillator, a digital-to-analog converter (DAC), or an analog-to-digital converter (ADC). Further, the wireless transceiver 210 may include a plurality of transmission/reception paths. Further, the wireless transceiver 210 may include at least one antenna array that is composed of a plurality of antenna elements.

From the viewpoint of hardware, the wireless transceiver 210 may be composed of a digital unit and an analog unit, and the analog unit may be composed of a plurality of sub-units in accordance with an operating power and an operating frequency. The digital unit may be implemented by at least one processor (e.g., digital signal processor (DSP)).

As described above, the wireless transceiver 210 transmits and receives signals.

Accordingly, the whole or a part of the wireless transceiver 210 may be called a transmitter, a receiver, or a transceiver. In the following description, transmission and reception that are performed through a radio channel may mean to include the above-described process that is performed by the wireless transceiver 210.

The backhaul transceiver 220 provides an interface to perform communication with other nodes in the network. That is, the backhaul transceiver 220 may convert a bit string that the base station transmits to another node, for example, another access node, another base station, higher node, or core network into a physical signal, and it converts the physical signal that is received from another node into a bit string.

The memory 230 may store therein a basic program for the operation of the base station, an application program, and data such as configuration information. The memory 230 may be composed of a volatile memory, a nonvolatile memory, or a combination of a volatile memory and a nonvolatile memory. Further, the memory 230 may provide the stored data in accordance with a request from the controller 240.

The controller 240 may control the overall operations of the base station. For example, the controller 240 transmits and receives signals through the wireless transceiver 210 or the backhaul transceiver 220. Further, the controller 240 may read and write data from and in the memory 230.

Further, the controller 240 may perform protocol stack functions required in the communication standard. According to another implementation example, the protocol stack may be included in the wireless transceiver 210. For this, the controller 240 may include at least one processor.

According to various embodiments, the controller 240 may control the base station to perform operations according to various embodiments to be described later.

Figure 3:
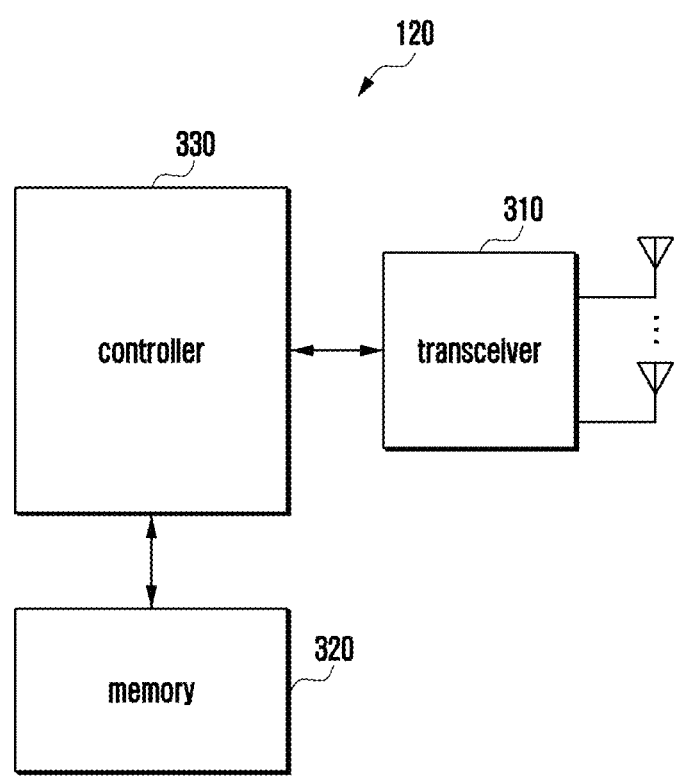
FIG. 3 illustrates a diagram of the configuration of a terminal in a wireless communication system according to various embodiments of the disclosure.

FIG. 3 illustrates a diagram of the configuration of a terminal in a wireless communication system according to various embodiments of the disclosure. The configuration exemplified in FIG. 3 may be understood as the configuration of the terminal 120. The term "~ unit" or "~or (~er)" as used hereinafter may mean a unit for processing at least one function or operation, and it may be implemented by hardware, software, or a combination of hardware and software.

With reference to FIG. 3, the terminal may include a transceiver 310, a memory 320, and a controller 330.

The transceiver 310 may perform functions for transmitting and receiving a signal on a radio channel. For example, the transceiver 310 may perform conversion between a baseband signal and a bit string in accordance with the physical layer standard of the system. For example, during data transmission, the transceiver 310 may encode and modulate the transmitted bit string to generate complex symbols. Further, during data reception, the transceiver 310 may demodulate and decode the baseband signal to restore the received bit string. Further, the transceiver 310 may up-convert the baseband signal into an RF band signal to transmit the RF band signal through an antenna, and it may down-convert the RF band signal that is received through the antenna into a baseband signal. For example, the transceiver 310 may include a transmission filter, a reception filter, an amplifier, a mixer, an oscillator, a DAC, and an ADC.

Further, the transceiver 310 may include a plurality of transmission/reception paths. Further, the transceiver 310 may include at least one antenna array that is composed of a plurality of antenna elements. From the viewpoint of hardware, the transceiver 310 may be composed of a digital circuit and an analog circuit (e.g., radio frequency integrated circuit (RFIC)). Here, the digital circuit and the analog circuit may be implemented by one package. Further, the transceiver 310 may include a plurality of RF chains. Further, transceiver 310 may perform beamforming.

As described above, the transceiver 310 transmits and receives signals. Accordingly, the whole or a part of the transceiver 310 may be called a transmitter, a receiver, or a transceiver. In the following description, transmission and reception that are performed through a radio channel may mean to include the above-described process that is performed by the transceiver 310.

The memory 320 may store therein a basic program for the operation of the terminal, an application program, and data such as configuration information. The memory 320 may be composed of a volatile memory, a nonvolatile memory, or a combination of a volatile memory and a nonvolatile memory. Further, the memory 320 may provide the stored data in accordance with a request from the controller 330.

The controller 330 controls the overall operations of the terminal. For example, the controller 330 transmits and receives signals through the transceiver 310. Further, the controller 330 may read and write data from and in the memory 320. Further, the controller 330 may perform protocol stack functions required in the communication standard. For this, the controller 330 may include at least one processor or microprocessor, or it may be a part of the processor. Further, a part of the transceiver 310 and the controller 330 may be called a communication processor (CP).

According to various embodiments, the controller 330 may control the terminal to perform operations according to various embodiments to be described later.

Figure 4:
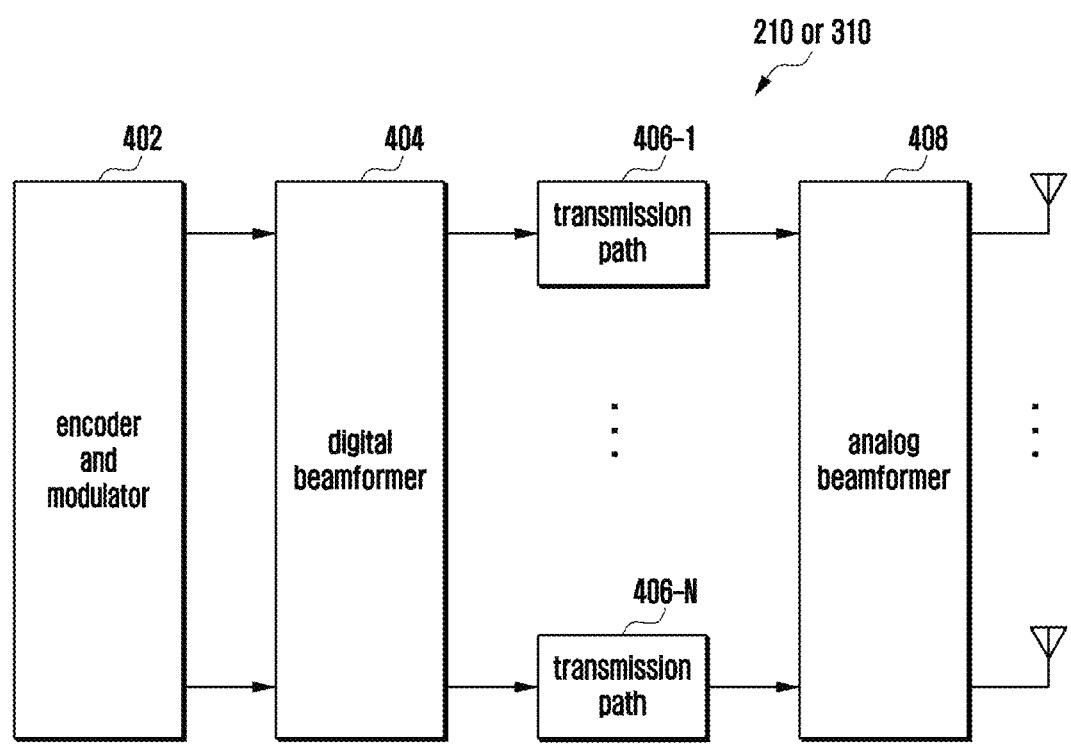
FIG. 4 illustrates a diagram of the configuration of a communicator in a wireless communication system according to various embodiments of the disclosure.

FIG. 4 illustrates a diagram of the configuration of a communicator in a wireless communication system according to various embodiments of the disclosure. FIG. 4 illustrates an example of the detailed configuration of the wireless transceiver 210 of FIG. 2 or the transceiver 310 of FIG. 3. Specifically, FIG. 4 exemplifies constituent elements for performing beamforming as a part of the wireless transceiver 210 of FIG. 2 or the transceiver 310 of FIG. 3.

With reference to FIG. 4, the wireless transceiver 210 or the transceiver 310 may include an encoder and modulator 402, a digital beamformer 404, a plurality of transmission paths 406-1 to 406-N, and an analog beamformer 408.

The encoder and modulator 402 may perform channel encoding. For the channel encoding, at least one of a low density parity check (LDPC) code, a convolution code, or a polar code may be used. The encoder and modulator 402 may perform constellation mapping to generate modulated symbols.

The digital beamformer 404 may perform beamforming for digital signals (e.g., modulated symbols). For this, the digital beamformer 404 multiplies the modulated symbols by beamforming weight values. Here, the beamforming weight values are used to change the magnitude and phase of the signals, and they may be called a precoding matrix or precoder. The digital beamformer 404 may output the digital-beamformed modulated symbols to the plurality of transmission paths 406-1 to 406-N. In this case, in accordance with a multiple input multiple output (MIMO) transmission technique, the modulated symbols may be multiplexed, or the same modulated symbols may be provided to the plurality of transmission paths 406-1 to 406-N.

The plurality of transmission paths 406-1 to 406-N may convert digital-beamformed digital signals into analog signals. For this, each of the plurality of transmission paths 406-1 to 406-N may include an inverse fast Fourier transform (IFFT) operation unit, a cyclic prefix (CP) insertion unit, a DAC, and an up-conversion unit. The CP insertion unit is for the orthogonal frequency division multiplexing (OFDM) scheme, and if another physical layer scheme (e.g., filter bank multicarrier (FBMC)) is applied, the CP insertion unit may be excluded. That is, the plurality of transmission paths 406-1 to 406-N may provide independent signal processes with respect to a plurality of streams generated through the digital beamforming. However, in accordance with the implementation scheme, parts of constituent elements of the plurality of transmission paths 406-1 to 406-N may be commonly used.

The analog beamformer 408 may perform beamforming for analog signals. For this, the analog beamformer 408 multiplies the analog signals by beamforming weight values. Here, the beamforming weight values are used to change the magnitude and phase of the signals. Specifically, in accordance with connection structures between the plurality of transmission paths 406-1 to 406-N and antennas, the analog beamformer 408 may be configured in various manners. For example, each of the plurality of transmission paths 406-1 to 406-N may be connected to one antenna array. As another example, the plurality of transmission paths 406-1 to 406-N may be connected to one antenna array. As still another example, the plurality of transmission paths 406-1 to 406-N may be adaptively connected to one antenna array or two or more antenna arrays.

Figure 5:
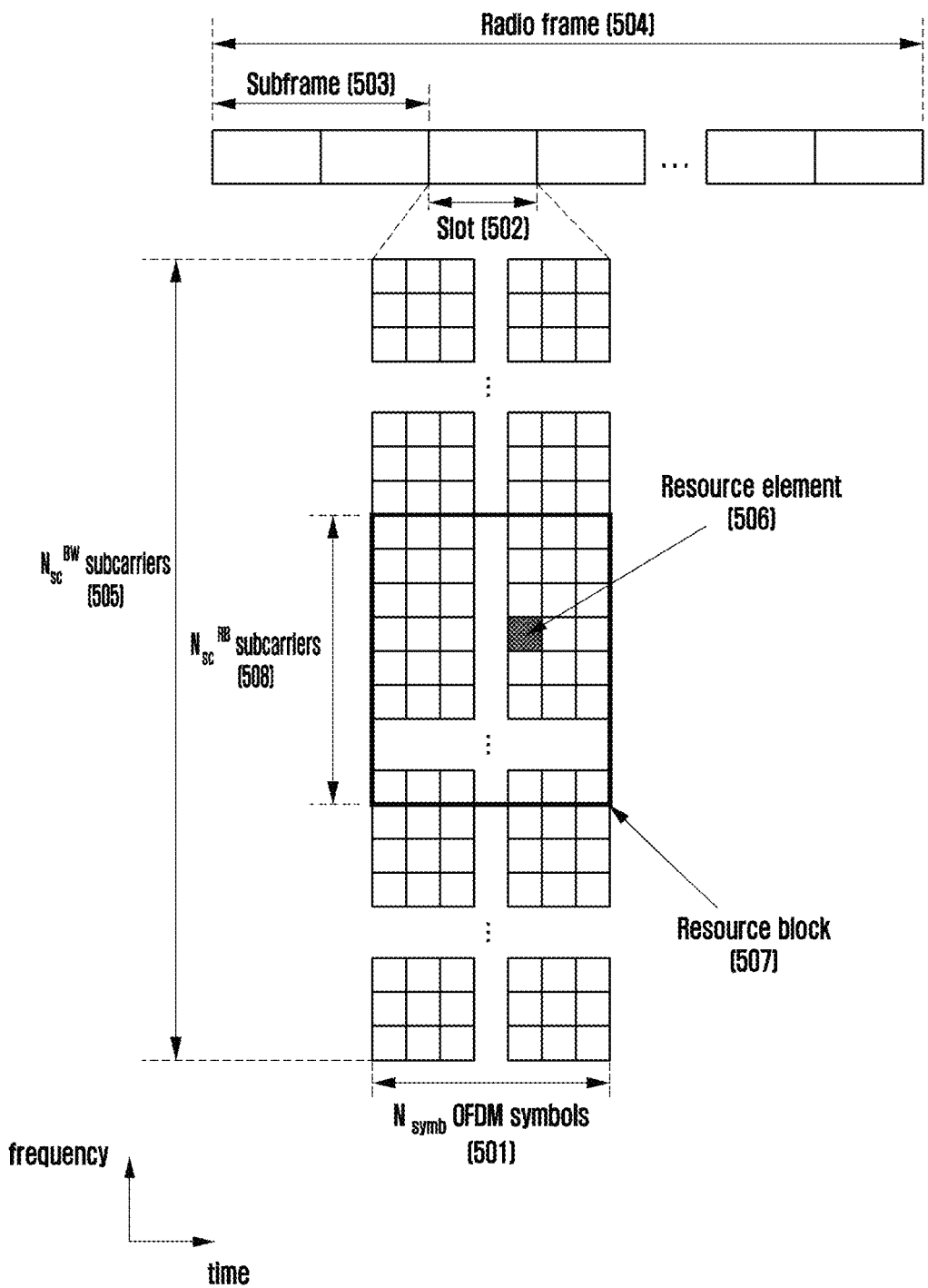
FIG. 5 illustrates a diagram of a transmission structure of a time-frequency domain that is a wireless resource domain in a wireless communication system according to various embodiments of the disclosure.

FIG. 5 illustrates a diagram of a transmission structure of a time-frequency domain that is a wireless resource domain in a wireless communication system according to various embodiments of the disclosure. According to various embodiments, the wireless communication system may include an NR system.

With reference to FIG. 5, in a radio resource domain, a horizontal axis represents a time domain, and a vertical axis represents a frequency domain. In the time domain, the minimum transmission unit may be an OFDM and/or DFT-s-OFDM symbol, and $N_{symb}$ OFDM and/or DFT-s-OFDM symbols 501 may gather and constitute one slot 502. In various embodiments, the OFDM symbols may include symbols in the case where a signal is transmitted and received using an OFDM multiplexing scheme, and the DFT-s-OFDM symbols may include symbols in the case where a signal is transmitted and received using a DFT-s-OFDM or SC-FDMA multiplexing scheme. Although an embodiment of the disclosure for OFDM symbols will be described for convenience in explanation, such an embodiment may also be applicable to an embodiment for DFT-s-OFDM symbols. Further, although an embodiment of the disclosure for downlink signal transmission and reception will be described for convenience in explanation, such an embodiment may also be applicable to an embodiment for uplink signal transmission and reception.

If a subcarrier spacing (SCS) is 15 kHz, one slot constitutes one subframe 503, and the length of the slot 502 or the subframe 503 may be 1 ms. In various embodiments, the number of slots 502 that constitute one subframe 503 and the length of the slot 502 may differ in accordance with the subcarrier spacing.

For example, if the subcarrier spacing is 30 kHz, four slots 502 may constitute one subframe 503. In this case, the length of the slot 502 is 0.5 ms, and the length of the subframe 503 is 1 ms. Further, a radio frame 504 may be a time domain interval that is composed of 10 subframes. In the frequency domain, the minimum transmission unit is a subcarrier, and the transmission bandwidth of the whole system may be composed of $N_{SC}^{BW}$ subcarriers 505 in total.

However, the subcarrier spacing, the number of slots 502 included in the subframe 503, the length of the slot 502, and the length of the subframe 503 may be variably applied. For example, in the case of an LTE system, the subcarrier spacing is 15 kHz, and two slots constitute one subframe 503. In this case, the length of the slot 502 may be 0.5 ms, and the length of the subframe 503 may be 1 ms.

In the time-frequency domain, the basic unit of resources may be a resource element (RE) 506, and the resource element 506 may be expressed by an OFDM symbol index and a subcarrier index.

A resource block (RB) (or physical resource block (PRB)) 507 may be defined by $N_{symb}$ successive OFDM symbols 501 in the time domain and $N_{SC}^{BB}$ successive subcarriers 508 in the frequency domain. Accordingly, in one slot 502, one RB 507 may include $N_{symb} \times N_{SC}^{RB}$ REs. In various embodiments, the minimum allocation unit of data in the frequency domain may be the RB 507. In the NR system, the number of symbols included in one RB may be $N_{symb}=14$, the number of subcarriers may be $N_{SC}^{RB}=12$, and the number of RBs (NRB) may be changed in accordance with the bandwidth of the system transmission band. In the LTE system, the number of symbols included in one RB may be $N_{symb}=7$, the number of sub carriers may be $N_{SC}^{BB}=12$, and the NRB may be changed in accordance with the bandwidth of the system transmission band.

Downlink control information may be transmitted within initial N OFDM symbols in a subframe. In general, the number may be N={1, 2, 3}, and a terminal may be configured with the number of symbols, in which the downlink control information can be transmitted through higher layer signaling, by a base station. Further, in accordance with the quantity of control information to be transmitted in the current slot, the base station may change the number of symbols, in which the downlink control information can be transmitted in the slot, for each slot, and it may transfer information on the number of symbols to the terminal on a separate downlink control channel.

In the NR and/or LTE system, scheduling information on downlink data or uplink data may be transferred from the base station to the terminal through downlink control information (DCI). In various embodiments, the DCI may be defined in accordance with various formats, and each format may indicate whether the DCI includes scheduling information on the uplink data (e.g., UL grant) or scheduling information on the downlink data (DL grant), whether the DCI is a compact DCI having small-sized control information or a fall-back DCI, whether spatial multiplexing using multiple antennas is applied, and/or whether the DCI is a DCI for power control.

For example, a DCI format that is the scheduling control information on the downlink data (DL grant) (e.g., DCI format 1_0 of the NR) may include at least one of the following control information.

Control information (DCI) format identifier: This is an identifier for identifying a DCI format.

Frequency domain resource assignment: This indicates RBs allocated for data transmission.

Time domain resource assignment: This indicates slots and symbols allocated for data transmission.

VRB-to-PRB mapping: This indicates whether to apply a virtual resource block (BRB) mapping scheme.

Modulation and coding scheme (MCS): This indicates a modulation scheme used for data transmission and the size of a transport block (TB) that is data intended to be transmitted.

New data indicator: This indicates whether an HARQ is initially transmitted or retransmitted.

Redundancy version: This indicates a redundancy version of an HARQ.

HARQ process number: This indicates the process number of an HARQ.

PDSCH assignment information (downlink assignment index): This indicates the number of PDSCH reception results (e.g., the number of HARQ-ACKs) to be reported from a terminal to a base station.

Transmit power control (TCP) command for a physical uplink control channel (PUCCH): This indicates a transmit power control command for a PUCCH that is an uplink control channel.

PUCCH resource indicator: This indicates PUCCH resources used to report an HARQ-ACK including the reception result for a PDSCH configured through corresponding DCI.

PUCCH transmit (PDSCH-to-HARQ feedback) timing indicator: This indicates slot or symbol information in which a PUCCH for HARQ-ACK report including the reception result for a PDSCH configured through corresponding DCI should be transmitted.

The DCI may pass through a channel coding and modulation process, and it may be transmitted on a PDCCH that is a downlink physical control channel (or control information, hereinafter being interchangeably used) or an enhanced PDCCH (EPDCCH) (or enhanced control information, hereinafter being interchangeably used). In the disclosure, reception of the control information on the PDCCH or EPDCCH may be expressed as reception of the PDCCH, and this may be equally applied even to signal transmission and reception on other channels. Accordingly, hereinafter, transmission and reception of the PDCCH or EPDCCH may be understood as DCI transmission and reception on the PDCCH or EPDCCH, and transmission and reception of the PDSCH may be understood as downlink data transmission and reception on the PDSCH.

In various embodiments, a cyclic redundancy check (CRC) scrambled with a specific radio network temporary identifier (RNTI) (or terminal identifier (C-RNTI)) that is independent with respect to each terminal is added to the DCI, and the DCI for each terminal is channel-coded and then is configured and transmitted on the independent PDCCH. In the time domain, the PDCCH may be transmitted at a control channel transmission interval. In the frequency domain, the PDCCH mapping location may be determined by an Identifier (ID) of each terminal, and it may be transmitted in the whole system transmission band.

The downlink data may be transmitted on a PDSCH that is a physical channel for transmitting the downlink data. The PDSCH may be transmitted after the control channel transmission interval, and in the frequency domain, scheduling information, such as a PDSCH mapping location and a PDSCH modulation scheme, may be determined based on the DCI being transmitted on the PDCCH.

Through the modulation and coding scheme (MCS) among the control information constituting the DCI, the base station notifies the terminal of the modulation scheme that is applied to the PDSCH to be transmitted and the transport block size (TBS) of the data to be transmitted. In various embodiments, the MCS may be composed of 5 bits or more or less. The TBS corresponds to the size of the data (transport block (TB)) that the base station intends to transmit before the channel coding for error correction is applied to the TB.

The modulation scheme that is supported in the NR system may include at least one of quadrature phase shift keying (QPSK), 16 quadrature amplitude modulation (16QAM), 64QAM, or 256QAM, and respective modulation orders Qm may be 2, 4, 6, and 8. That is, in the case of the QPSK modulation, 2 bits per symbol may be transmitted, and in the case of the 16QAM modulation, 4 bits per symbol may be transmitted. Further, in the case of the 64QAM modulation, 6 bits per symbol may be transmitted, and in the case of the 256QAM modulation, 8 bits per symbol may be transmitted. Further, in accordance with the system modification, a modulation scheme over the 256QAM may be used.

In the NR system, the uplink/downlink HARQ scheme may include an asynchronous HARQ scheme in which a data retransmission time is not fixed. For example, in the case of the downlink, if the base station receives a feedback of an HARQ NACK from the terminal with respect to initially transmitted data, the base station may freely determine the transmission time of the retransmitted data in accordance with a scheduling operation. The terminal may perform buffering of data that is determined as an error as the result of decoding the received data for the HARQ operation, and then it may perform combining of the error data with the data retransmitted from the base station. HARQ ACK/NACK information of the PDSCH transmitted in subframe n-k may be transmitted from the terminal to the base station through the PUCCH or PUSCH in subframe n.

According to an embodiment, in the case of the 5G communication system such as the NR, the k value may be included in the DCI for indicating or scheduling the PDSCH transmitted in subframe n-k to be transmitted, or it may be configured to the terminal through higher layer signaling. In this case, the base station may configure one or more k values to the terminal through the higher layer signaling, or it may indicate a specific k value to the terminal through the DCI. In this case, the k value may be determined in accordance with the HARQ-ACK processing capability, in other words, in accordance with the minimum time required for the terminal to receive the PDSCH and to generate and report the HARQ-ACK for the PDSCH. Further, the terminal may use a predefined value or a default value as the k value until the terminal is configured with the k value.

Although various embodiments of the disclosure have been described based on the NR system, the contents of the disclosure are not limited to the NR system, but they may be applied to various wireless communication system, such as LTE, LTE-A, LTE-A-Pro, and 5G. Further, although a system and an apparatus for transmitting and receiving signals using an unlicensed band have been described in the contents of the disclosure, it may be also possible to apply the contents of the disclosure even to a system that operates in a licensed band.

Hereinafter, in the disclosure, the higher layer signaling or the higher signal may correspond to a signal transfer method for transferring a signal from the base station to the terminal using the downlink data channel of the physical layer or transferring a signal from the terminal to the base station using the uplink data channel of the physical layer, and it may correspond to at least one of signal transfer methods for transferring the signal through radio resource control (RRC) signaling, packet data convergence protocol (PDCP) signaling, or media access control (MAC) control elements (MAC CE). Further, the higher layer signaling or the higher signal may include system information being commonly transmitted to a plurality of terminals, for example, system information blocks (SIB).

In the case of a system that performs communication in an unlicensed band, a communication device (base station or terminal) intended to transmit a signal through the unlicensed band may perform a channel access procedure (or listen-before talk (LBT)) for the unlicensed band intended to perform communication before the signal is transmitted. If it is determined that the unlicensed band is in an idle state in accordance with the channel access procedure, the communication device may perform the signal transmission by accessing the unlicensed band. If it is determined that the unlicensed band is not in the idle state in accordance with the performed channel access procedure, the communication device may be unable to transmit the signal.

The channel access procedure in the unlicensed band may be discriminated depending on whether the start time of the channel access procedure of the communication device is fixed (frame-based equipment (FBE)) or is variable (load-based equipment (LBE)). In addition to the start time of the channel access procedure, the communication device may be determined as an FBE device or an LBE device depending on whether the transmit/receive structure of the communication device has one period or does not have the period.

Here, the fact that the start time of the channel access procedure has been fixed means that the channel access procedure of the communication device may start periodically in accordance with a predefined period or a period declared or configured by the communication device. As another example, the fact that the start time of the channel access procedure has been fixed may mean that the transmission or reception structure of the communication device has one period.

Here, the fact that the start time of the channel access procedure is variable means that the channel access procedure of the communication device can start any time when the communication device intends to transmit the signal through the unlicensed band. As still another example, the fact that the start time of the channel access procedure is variable means that the transmission or reception structure of the communication device does not have one period, but it may be determined as needed.

Hereinafter, the channel access procedure (hereinafter, traffic-based channel access procedure or channel access procedure) in the case where the start time of the channel access procedure of the communication device is variable (load-based equipment) will be described.

The channel access procedure in the unlicensed band may include a procedure of determining an idle state of the unlicensed band by measuring the strength of the signal being received through the unlicensed band for a fixed time or a time calculated in accordance with a predefined rule (e.g., time calculated through one random value selected by at least the base station or the terminal), and comparing the measured signal strength with a predefined threshold value or a threshold value that is calculated by a function of determining the level of the received signal strength in accordance with at least one variable among a channel bandwidth, a signal bandwidth in which a signal intended to be transmitted is transmitted, and/or a transmission power strength.

For example, the communication device may measure the signal strength for X μs (e.g., 25 μs) that is a predetermined or preconfigured time immediately before the time when the signal is to be transmitted, and if the measured signal strength is lower than a predefined or calculated threshold value T (e.g., −72 dBm), the communication device may determine that the unlicensed band is in an idle state, and may transmit a configured signal. In this case, the maximum time when successive signal transmission is possible after the channel access procedure may be limited depending on the maximum channel occupancy time defined for each country, area, or frequency band in accordance with each unlicensed band, and it may also be limited depending on the kind of the communication device (e.g., base station or terminal, or master or slave). For example, in the case of Japan, in the 5 GHz unlicensed band, a base station or a terminal may transmit a signal by occupying a channel with respect to an unlicensed band that is determined to be in an idle state after performing the channel access procedure without performing an additional channel access procedure for the maximum time of 4 ms.

More specifically, in the case where the base station or the terminal intends to transmit a downlink or uplink signal using the unlicensed band, the channel access procedure that can be performed by the base station or the terminal may be discriminated into at least following types.

Type 1: It transmits an uplink or downlink signal after performing the channel access procedure for a variable time.

Type 2: It transmits an uplink or downlink signal after performing the channel access procedure for a fixed time.

Type 3: It transmits an uplink or downlink signal without performing the channel access procedure.

A transmission device (e.g., base station or terminal) that intends to transmit a signal using an unlicensed band may determine the type of the channel access procedure in accordance with the kind of the signal to be transmitted. In the disclosure, for convenience in explanation, it may be assumed that the transmission device is the base station, and the transmission device and the base station may be interchangeably used.

For example, in the case where the base station intends to transmit a downlink signal including a downlink data channel using the unlicensed band, the base station may perform the channel access procedure of type 1. Further, in the case where the base station intends to transmit a downlink signal that does not include a downlink data using the unlicensed band, for example, in the case where the base station intends to transmit a synchronization signal or a downlink control information, the base station may perform the channel access procedure of type 2, and it may transmit a downlink signal.

In this case, the type of the channel access procedure may be determined in accordance with the transmission length of the signal intended to be transmitted using the unlicensed band, the time for occupying and using the unlicensed band, or the length of a spacing. In general, in type 1, the channel access procedure may be performed for a longer time than the time when the channel access procedure is performed in type 2. Accordingly, in the case where the communication device intends to transmit the signal for a short duration or for a time that is equal to or shorter than a reference time (e.g., X ms or Y symbol), the channel access procedure of type 2 may be performed. In contrast, in the case where the communication device intends to transmit the signal for a long duration or for a time that is equal to or exceeds the reference time (e.g., X ms or Y symbol), the channel access procedure of type 1 may be performed. In other words, in accordance with the usage time of the unlicensed band, different types of channel access procedures may be performed.

In the case where the transmission device perform the channel access procedure of type 1 in accordance with at least one of the above-described references, the transmission device may determine a channel access priority class (or channel access priority) in accordance with a quality of service class identifier (QCI) of the signal intended to be transmitted using the unlicensed band, and it may perform the channel access procedure using at least one of predefined configuration values as in Table 1 with respect to the determined channel access priority class. Table 1 below shows a mapping relationship between the channel access priority class and the QCI.

For example, QCI 1, 2, or 4 may mean a QCI value for a service, such as conversational voice, conversational video (live streaming), or non-conversational video (buffered streaming). If it is intended to transmit the signal for the service that does not match the QCI of Table 1 using the unlicensed band, the transmission device may select the QCI that is closest to the QCI of Table 1, and it may select the channel access priority class for the selected QCI.

TABLE 1

| Channel Access Priority | QCI |
| --- | --- |
| 1 | 1, 3, 5, 65, 66, 69, 70 |
| 2 | 2, 7 |

TABLE 1-continued

| Channel Access Priority | QCI |
|---|---|
| 3 | 4, 6, 8, 9 |
| 4 | — |

In various embodiments, parameter values for the channel access priority class (e.g., defer duration in accordance with a determined channel access priority p, a set (CW_p) of contention window values or sizes, and minimum and maximum values (CW_min,p, CW_max,p) of the contention window, and the maximum channel occupancy possible duration (T_mcot,p)) may be determined as in Table 2. Table 2 shows parameter values for the channel access priority class in the case of a downlink.

In other words, the base station that intends to transmit the downlink signal using the unlicensed band may perform the channel access procedure for the unlicensed band for the minimum time of T_f+m_p*T_sl. If the base station intends to perform the channel access procedure with the channel access priority class 3 (p=3), the size of T_f+m_p*T_sl may be configured using m_p=3 with respect to the defer duration size T_f+m_p*T_sl that is necessary to perform the channel access procedure. Here, T_f is a value fixed to 16 µs, and the initial time T_sl should be in an idle state. At the remaining time T_f-T_sl after the time T_sl among the time T_f, the base station may not perform the channel access procedure. In this case, even if the base station performs the channel access procedure at the remaining time T_f-T_sl, the result of the channel access procedure may not be used. In other words, the time T_f-T_sl is the time when the base station defers the performing of the channel access procedure.

If it is determined that the unlicensed band is in the idle state at all the time m_p*T_sl, the number N may be N=N-1. In this case, the number N may be selected as a certain integer value among values between 0 and the contention window value CW_p at the time when the channel access procedure is performed. In the case of the channel access priority class 3, the minimum contention window value and the maximum contention window value are 15 and 63, respectively. If it is determined that the unlicensed band is in the idle state in the defer duration and an additional duration when the channel access procedure is performed, the base station may transmit the signal through the unlicensed band for the time T_mcot,p (8 ms).

Meanwhile, Table 2 shows channel access priority classes (or channel access priorities) in the downlink. In the disclosure, for convenience in explanation, embodiments are described based on the downlink channel access priority classes. In the case of the uplink, the channel access priority class in Table 2 may be used in the same manner, or a separate channel access priority class for the uplink transmission may be used.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127, 255,511,1023} |

The initial contention window value CW_p may be the minimum contention window value CW_min,p. The base station having selected the value N may perform the channel access procedure in the duration T_sl, and if it is determined that the unlicensed band is in the idle state through the channel access procedure performed in the duration T_sl, the base station may change the value N to N=N-1. In the case of N=0, the base station may transmit the signal through the unlicensed band for the maximum time T_mcot,p. If the unlicensed band that is determined through the channel access procedure at the time T_sl is not in the idle state, the base station may re-perform the channel access procedure without changing the value N.

The size of the contention window value CW_p may be changed or maintained in accordance with the ratio Z of the NACK among the reception results ACK/NACK for the downlink data (e.g., downlink data received in the reference subframe or reference slot) that one or more terminals having received the downlink data transmitted through the downlink data channel in the reference subframe or reference slot have transmitted or reported to the base station. In this case, the reference subframe or reference slot may be determined as the downlink signal transmission interval (or the maximum channel occupancy time (MCOT)) that the base station has transmitted most recently through the unlicensed band at the time when the base station starts the channel access procedure, at the time when the base station selects the value N in order to perform the channel access procedure, or immediately before the two time points.

Figure 6:
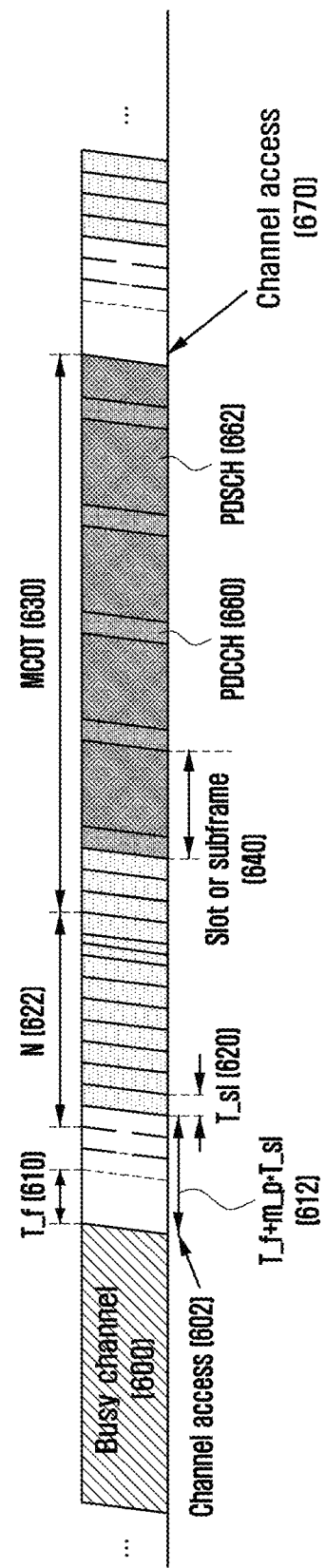
FIG. 6 illustrates a diagram of a first embodiment of a channel access procedure in an unlicensed band in a wireless communication system according to various embodiments of the disclosure.

FIG. 6 illustrates a diagram of a first embodiment of a channel access procedure in an unlicensed band in a wireless communication system according to various embodiments of the disclosure.

With reference to FIG. 6, the first slot or subframe 640 of the downlink signal transmission interval (channel occupancy time (hereinafter, COT) 630), which the base station has transmitted most recently through the unlicensed band at the time 670 when the base station starts the channel access procedure, at the time when the base station selects the value N in order to perform the channel access procedure, or immediately before the time points, may be defined as the reference slot or subframe. Specifically, the first slot or subframe in which the signal is transmitted may be defined as the reference slot or subframe in the whole slot or subframe of the downlink signal transmission interval 630. Further, if the downlink signal transmission interval starts after the first symbol of the slot or subframe, the slot or subframe in which the downlink signal transmission starts and the first subframe in which the signal is transmitted in the whole subframe may be defined as the reference slot or subframe.

If the ratio Z of the NACK is equal to or higher than Z that is a predetermined or preconfigured value among the reception results for the downlink data that one or more terminals having received the downlink data transmitted through the downlink data channel in the reference slot or subframe have transmitted or reported to the base station, the base station may perform the channel access procedure 670 by determining the contention window value or size being used in the channel access procedure 670 of the corresponding base station as the contention window value or size that is larger than the contention window value or size of the previous channel access procedure 602 (e.g., large contention window size next to the contention window size in the previous channel access procedure 602), in other words, by increasing the contention window size.

If the base station is unable to receive a report of the reception result of the terminal for the downlink data transmitted in the first slot or subframe of the transmission interval 630, for example, if the time interval between the first subframe and the time 670 when the base station starts the channel access procedure is equal to or larger than n slots or subframes (in other words, if the base station starts the channel access procedure before the time when the terminal can report the downlink data channel reception result with respect to the first subframe), the first subframe of the latest downlink signal transmission interval transmitted before the downlink signal transmission interval 630 may become the reference subframe.

In other words, if the base station is unable to receive the reception result of the terminal for the downlink data transmitted in the reference subframe 640 at the time 670 when the base station starts the channel access procedure, at the time when the base station selects the value N to perform the channel access procedure, or immediately before the time points, the base station may determine the first subframe of the most recently transmitted downlink signal transmission interval among the reception results for the downlink data already received from the terminals as the reference subframe, and it may determine the contention window using the downlink data reception result of the terminal with respect to the reference subframe. Further, the base station may determine the contention window size that is used in the channel access procedure 670 using the downlink data reception results received from the terminals with respect to the downlink data transmitted on the downlink data channel in the reference subframe.

For example, if 80% or more of the reception results of the terminal with respect to the downlink data transmitted to the terminal on the downlink data channel in the first subframe among the downlink signals transmitted through the unlicensed band is determined as the NACK, the base station, having transmitted the downlink signal through the channel access procedure (e.g., CW_p=15) that is configured in accordance with the channel access priority class 3 (p=3), may increase the contention window from the initial value (CW_p=15) to the next contention window value (CW_p=31). The ratio value of 80% is exemplary, and various modifications thereof are possible.

If 80% or more of the reception results of the terminal is not determined as the NACK, the base station may maintain the contention window value as the existing value or it may change the contention window value to the initial value. In this case, a method for determining the reception result that is effective to the determination of the change of the contention window size among the reception results for the downlink data that the terminal has transmitted or reported to the base station with respect to the downlink data transmitted on the downlink data channel in the reference subframe or reference slot in which the change of the contention window size is determined, in other words, a method for determining the value Z, is as follows.

In the case where the base station transmits one or more codewords or TBs to one or more terminals in the reference subframe or reference slot, the base station may determine the value Z by the ratio of the NACK among the reception results transmitted or reported by the terminal with respect to the TB received in the reference subframe or reference slot. For example, if two codewords or two TBs are transmitted to one terminal in the reference subframe or the reference slot, the base station may receive, from the terminal, the transmission or report of the reception result of the downlink data signal for the two TBs. If the ratio Z of the NACK of the two reception results is predefined or is equal to or higher than a threshold value (e.g., Z=80%) configured between the base station and the terminal, the base station may change or increase the contention window size.

In this case, if the terminal transmits or reports the reception result of the downlink data for one or more subframes (e.g., M subframes) including the reference subframe or slot to the base station through bundling, the base station may determine that the terminal has transmitted M reception results. Further, the base station may determine the value Z as the ratio of the NACK among the M reception results, and it may change, maintain, or initialize the contention window size.

If the reference subframe corresponds to the second slot of two slots included in one subframe, or if the downlink signal is transmitted from the symbol after the first symbol in the reference subframe, the value Z may be determined as the ratio of the NACK among the reception results that the terminal transmits or reports to the base station with respect to the downlink data received in the reference subframe and the next subframe.

Further, if scheduling information or downlink control information for the downlink data channel is transmitted from the cell in which the downlink data is transmitted, the cell that is equal to the frequency band, or the frequency band, or if scheduling information or downlink control information for the downlink data channel is transmitted through an unlicensed band, from another cell that is different from the cell in which the downlink data is transmitted, or through another frequency, or if it is determined that the terminal has not transmitted the reception result for the downlink data received in the reference subframe or the reference slot, or if it is determined that the reception result for the downlink data transmitted by the terminal is at least one of discontinuous transmission (DTX), NACK/DTX, or any state, the base station may determine the value Z by determining the reception result of the terminal as the NACK.

Further, if it is determined that the reception result for the downlink data transmitted by the terminal is at least one of the DTX, NACK/DTX, or any state in the case where the scheduling information or downlink control information for the downlink data channel is transmitted through a licensed band, the base station may not reflect the reception result of the terminal in the reference value Z of the contention window variation. In other words, the base station may determine the value Z through disregarding of the reception result of the terminal.

Further, if the base station has not actually transmitted the downlink data (no transmission) among the reception results for the downlink data for the reference subframe or reference slot that the terminal has transmitted or reported to the base station, the base station may determine the value Z through disregarding of the reception result of the terminal.

Hereinafter, the channel access procedure in the case where the start time of the channel access procedure of the communication device is fixed (frame-based equipment (FBE)) (hereinafter, frame-based channel access procedure or channel access procedure) will be described using FIG. 7.

Figure 7:
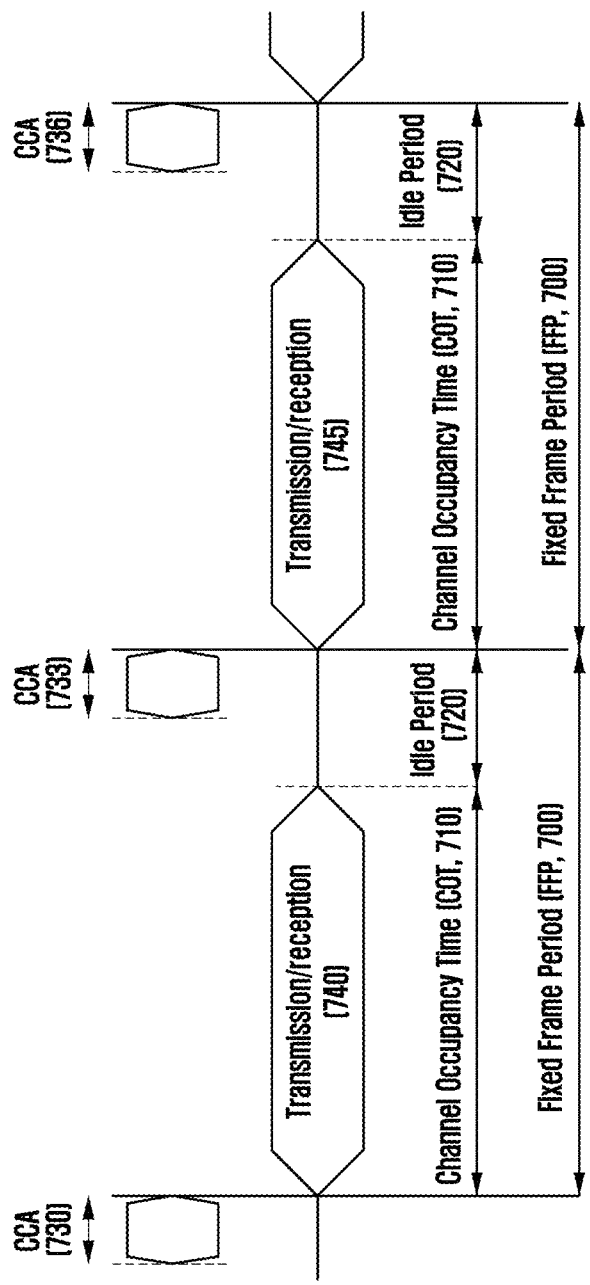
FIG. 7 illustrates a diagram of a second embodiment of a channel access procedure in an unlicensed band in a wireless communication system according to various embodiments of the disclosure.

FIG. 7 illustrates a second embodiment of a channel access procedure in an unlicensed band in a wireless communication system according to various embodiments of the disclosure.

A communication device that performs a frame-based channel access procedure may periodically transmit and receive signals in accordance with a fixed frame period (FFP). Here, the fixed frame period 700 may be declared or configured by the communication device (e.g., base station), and it can be configured, for example, in the range of 1 ms to 10 ms. However, this is merely an embodiment, and the fixed frame period may be change in accordance with the configuration of the base station.

In this case, the channel access procedure for the unlicensed band (or clear channel access (CCA)) may be performed immediately before the start of each frame period (730, 733, and 736), and like the channel access procedure of type 2 as described above, the channel access procedure may be performed for a fixed time or one observation slot. If it is determined that the unlicensed band is in an idle state or it is an idle channel as the result of the channel access procedure, the communication device can transmit and receive signals without performing a separate channel access procedure for 95% of the maximum time of the fixed frame period 700 (hereinafter, channel occupancy time (COT) 710). In this case, 5% of the minimum time of the fixed frame period 700 is an idle time 720 for which the signals are unable to be transmitted or received, and the channel access procedure may be performed within the idle time.

The frame-based channel access procedure has the advantage that it is relatively simpler than the traffic-based channel access procedure, and it can periodically perform the channel access of the unlicensed band. However, because the start time of the channel access procedure is fixed, the probability to be able to access the unlicensed band in comparison with the traffic-based channel access procedure may be decreased.

In the 5G system, in consideration of various services and requirements, it is necessary to flexibly define the frame structure. For example, respective services may have different subcarrier spacings in accordance with the requirements. At present, the 5G communication system may support a plurality of subcarrier spacings, and the subcarrier spacing may be determined by mathematical expression 1 below.

$$\Delta f = f_0 2^m$$ [Mathematical expression 1]

In mathematical expression 1, $f_0$ denotes a basic subcarrier spacing, m denotes an integer scaling factor, and $\Delta f$ denotes a subcarrier spacing. For example, if $f_0$ is 15 kHz, a set of subcarrier spacings that the 5G communication system can have may be composed of one of 3.75 kHz, 7.5 kHz, 15 kHz, 30 kHz, 60 kHz, 120 kHz, 240 kHz, and 480 kHz. The set of usable subcarrier spacings may differ in accordance with the frequency band. For example, in the frequency band that is equal to or lower than 6 GHz, 3.75 kHz, 7.5 kHz, 15 kHz, 30 kHz, and 60 kHz may be used, whereas in the frequency band that is equal to or higher than 6 GHz, 60 kHz, 120 kHz, and 240 kHz may be used.

In various embodiments, the length of an OFDM symbol may differ in accordance with the subcarrier spacing constituting the corresponding OFDM symbol. This is because the subcarrier spacing and the OFDM symbol length are in a reciprocal relationship as the feature of the OFDM symbol. For example, if the subcarrier spacing is increased twice, the symbol length is reduced to ½, whereas if the subcarrier spacing is reduced to ½, the symbol length is lengthened twice.

Figure 8A:
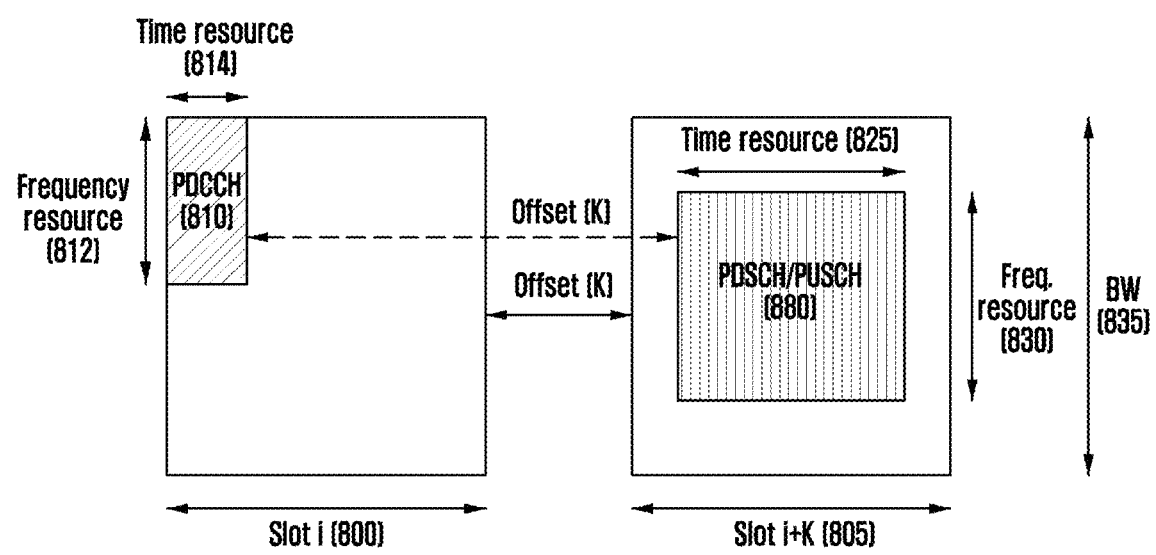
FIG. 8A illustrates a diagram of downlink and/or uplink scheduling, an HARQ-ACK feedback method for the scheduling, and resource regions in a wireless communication system according to various embodiments of the disclosure.

FIG. 8A illustrates downlink and/or uplink scheduling, an HARQ-ACK feedback method for the scheduling, and resource regions in a wireless communication system according to various embodiments of the disclosure.

With reference to FIG. 8A, resource regions on which data channels are transmitted in a 5G or NR communication system. A terminal may monitor and/or search for a PDCCH 810 in a downlink control channel (hereinafter, interchangeably used with a PDCCH) region (hereinafter, control resource set (CORESET) or search space (SS)). In this case, the downlink control channel region may be composed of information of a time domain 814 and a frequency domain 812, and the information of the time domain 814 may be configured in the unit of a symbol, while the information of the frequency domain 812 may be configured in the unit of an RB or an RB group.

If the terminal detects the PDCCH 810 in slot i 800, the terminal may acquire downlink control information (DCI) transmitted on the detected PDCCH 810. Through the received downlink control information (DCI) the terminal may acquire scheduling information on a downlink data channel and an uplink data channel. In other words, the DCI may include at least resource region (or PDSCH transmission region) information that the terminal should receive the downlink data channel (hereinafter, interchangeably used with the PDSCH) transmitted from the base station or resource region information that the terminal is allocated with from the base station for uplink data channel (PUSCH) transmission.

A case where the terminal is scheduled with the uplink data channel (PUSCH) transmission will be described as an example. The terminal having received the DCI may acquire a slot index that should receive the PUSCH through the DCI or offset information K, and it may determine a PUSCH transmission slot index. For example, the terminal may determine to be scheduled to transmit the PUSCH in slot i+K 805 through the received offset information K based on the slot index i 800 having received the PDCCH 810. In this case, the terminal may determine slot i+K 805 or a PUSCH start symbol or time in the slot i+K through the received offset information K based on the CORESET having received the PDCCH 810.

Further, the terminal may acquire information on a PUSCH transmission time-frequency resource region 840 in the PUSCH transmission slot 805 through the DCI. The PUSCH transmission frequency resource region information 830 may include a PRB or group unit information of the PRB. Meanwhile, the PUSCH transmission frequency resource region information 830 may be information on a region included in an initial uplink bandwidth (BW) or an initial uplink bandwidth part (BWP) that is determined or configured through the initial access procedure for the terminal. If the terminal is configured with the uplink bandwidth (BW) or the uplink bandwidth part (BWP) through a higher signal, the PUSCH transmission frequency resource region information 830 may be information about the region included in the uplink bandwidth (BW) or the uplink bandwidth part (BWP) configured through the higher signal.

In various embodiments of the disclosure, PUSCH transmission time resource region information 825 may be a symbol or symbol group unit information, or it may be information indicating absolute time information. The PUSCH transmission time resource region information 825 may be expressed as a combination of a PUSCH transmission start time, the symbol and the length of the PUSCH, PUSCH end time, or the symbol, and it may be included in the DCI as one field or value. The terminal may transmit the PUSCH on the PUSCH transmission resource region 840 identified through the DCI.

In various embodiments of the disclosure, the terminal having received the PDSCH 840 may report (feedback) the reception result for the PDSCH 840 (e.g., HARQ-ACK/NSCK) to the base station. In this case, the uplink control channel (PUCCH) transmission resource for transmitting the reception result for the PDSCH 840 may be determined using a PDSCH-to-HARQ timing indicator indicated through the DCI 810 for scheduling the PDSCH 840 and a PUCCH resource indicator. In other words, the terminal having received the PDSCH-to-HARQ timing indicator K1 through the DCI 810 may transmit the PUCCH in the reception slot 805 for the PDSCH 840 to the slot after K1. In this case, the PUCCH transmission resource in the PUCCH transmission slot may be indicated through the PUCCH resource indicator included in the DCI, and the terminal may perform the PUCCH transmission on the indicated resource. In this case, if transmission of a plurality of PUCCHs is configured or indicated in the PUCCH transmission slot 850, the terminal may perform the PUCCH transmission on the PUCCH resource excluding the resource indicated through the PUCCH resource indicator of the DCI 810.

In the 5G communication system, for a dynamic change of the downlink signal transmission and uplink signal transmission intervals in a time division duplex (TDD) system, whether respective OFDM symbols constituting one slot are downlink or uplink symbols or flexible symbols may be indicated by a slot format indicator (SFI). Here, the symbol indicated as a flexible symbol may be neither of the downlink and uplink symbols or may be a symbol that can be changed to the downlink or uplink symbol by terminal-specific control information or scheduling information. In this case, the flexible symbol may include a gap guard that is necessary in a process of changing from the downlink to the uplink.

The slot format indicator may be simultaneously transmitted to a plurality of terminals through a terminal group (or cell) common control channel. In other words, the slot format indicator may be transmitted on the PDCCH being CRC-scrambled with an identifier (e.g., SF-RNTI) that is different from the terminal unique identifier (C-RNTI (cell-RNTI)). In various embodiments, the slot format indicator may include information on N slots, and the value N may be an integer or a natural number value that is larger than 0, or it may be a value that the base station has configured to the terminal through the higher signal among predefined possible values, such as 1, 2, 5, 10, and 20. Further, the size of the slot format indicator information may be configured by the base station to the terminal through the higher signal. An example of the slot format that can be indicated by the slot format indicator is indicated as in Table 3.

TABLE 3

| Format | Symbol numbers (or indexes) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | X | X | X | X | X | X | U |
| 44 | D | D | D | D | D | X | X | X | X | X | X | U | U | U |
| 45 | D | D | D | D | D | X | X | U | U | U | U | U | U | U |

TABLE 3-continued

| | Symbol numbers (or indexes) in one slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | D | X | X | X | X | X |
| 49 | D | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | U | D | X | X | X | X | X | X | U |
| 61 | D | D | X | X | X | X | U | D | D | X | X | X | X | U |
| 62-254 | Reserved | | | | | | | | | | | | | |
| 255 | UE determines the slot format for the slot based on tdd-UL-DL-ConfigurationCommon, tdd-UL-DL-ConfigurationCommon2, or tdd-UL-DL-ConfigDedicated and, if any, on detected DCI formats | | | | | | | | | | | | | |

In Table 3, D means a downlink, U means an uplink, and X means a flexible symbol. According to Table 3, the total number of supportable slot formats is 256. In the current NR system, the maximum size of the slot format indicator information bits is 128 bits, and the slot format indicator information bit is a value that the base station can configure to the terminal through a higher signal (e.g., dci-Payload-Size). In various embodiments, the slot format indicator information may include slot formats for a plurality of serving cells, and the slot formats for the respective serving cells may be divided through serving cell IDs. Further, slot format combinations for one or more slots may be included for the respective serving cells. For example, if the size of the slot format indicator information bits is 3 bits, and the slot format indicator information is composed of slot format indicators for one serving cell, the 3-bit slot format indicator information may be composed of 8 slot format indicators or slot formation indicator combinations (hereinafter, slot format indicators) in total, and the base station may indicate one of the 8 slot format indicators through terminal group common control information (group common DCI).

In various embodiments, at least one of the 8 slot format indicators may be composed of a slot format indicator for a plurality of slots. For example, Table 4 shows an example of 3-bit slot format indicator information composed of slot formats of Table 3. Five slot format indicators (slot format combination IDs 0, 1, 2, 3, and 4) of the slot format indicator information may be slot format indicators for one slot, and the remaining 3 slot format indicators may be information on slot formation indicators (slot format combination IDs 5, 6, and 7) for 4 slots, and they may be successively applied to 4 slots.

TABLE 4

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |

TABLE 4-continued

| Slot format combination ID | Slot Formats |
|---|---|
| 6 | 1 1 1 1 |
| 7 | 2 2 2 2 |

The terminal may receive configuration information for the PDCCH on which the slot format indicator information should be detected through the higher signal, and it may detect the slot format indicators in accordance with the configuration. For example, the terminal may be configured with at least one of CORESET configuration for detecting the slot format indicator information, search space configuration, RNTI information used for CRC scrambling of the DCI for transmitting the slot format indicator information, a search space period, or offset information.

Figure 9:
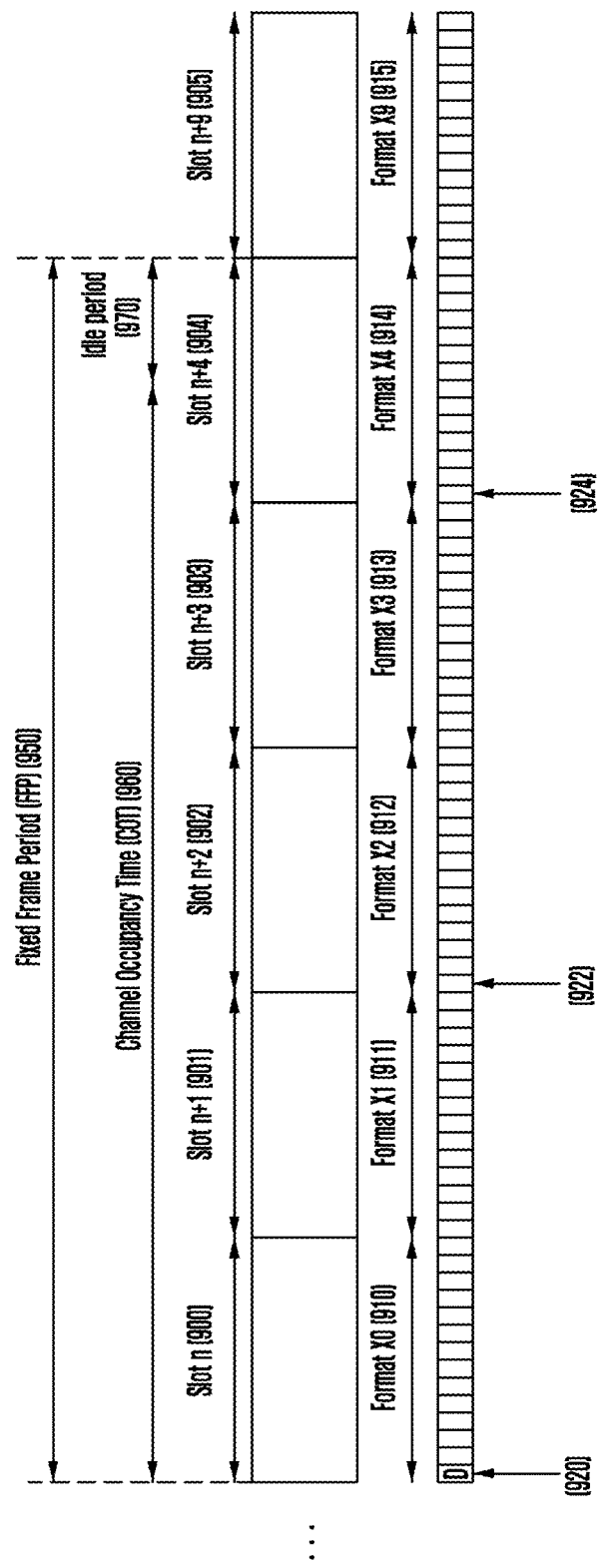
FIG. 9 illustrates a diagram of a channel occupancy time in a wireless communication system according to various embodiments of the disclosure.

FIG. 9 illustrates a diagram of a channel occupancy time in a wireless communication system according to various embodiments of the disclosure.

FIG. 9 illustrates a case where PDCCH regions 920, 922, and 924 in which a terminal should detect slot format indicator information are provided, and the period of the PDCCH region is of 2 slots. In other words, the terminal may detect DCI that is CRC-scrambled by slot format indicator identifiers (hereinafter, SFI-RNTI) in the PDCCH regions 920, 922, and 924 in slot n 900, slot n+2 902, and slot n+4 904 in accordance with the configured PDCCH region and the period thereof, and it may acquire the slot format indicator for two slots through the detected DCI. In this case, the detected DCI may include slot format indicator information for two or more slots, and for how many slots the slot format indicators are included in the DCI may be configured through a higher signal. Configuration information regarding for how many slots the slot format indicators are included in the DCI may be included in the higher signal that is equal to the higher signal for configuring the slot format indicator information.

For example, with reference to FIG. 9, the terminal may acquire slot formation indicator information 910 and 911 for slot n 900 and slot n+1 901 in the PDCCH region 920 of slot n 900. In this case, the slot formation indicator information may have the formats in Table 4.

If the base station transmits the slot format indicator information in an unlicensed band, and in particular, if the slot format indicator information includes the slot format indicators for a plurality of slots, the base station may be unable to determine the slot format indicator information for at least one slot depending on whether to access the channel in the unlicensed band. In other words, as shown in FIG. 9, in the case where the base station performs a channel access procedure for the unlicensed band before slot n 900, determines an idle channel through the channel access procedure, and occupies and uses the channel in slot n 900 to slot n+4 904, the base station is unable to predict the result of the channel access procedure in the unlicensed band, and thus it is unable to determine the slot format indicator of slot n+5 905. In other words, when transmitting slot format indicator information 914 and 915 for slot n+4 904 and slot n+5 905 in a PDCCH 924, the base station is required to determine how it indicates the slot format indicator information of slot n+5 905. For example, the base station may indicate that the slot format indicator for the time excluding the channel occupancy time is flexible.

Figure 10:
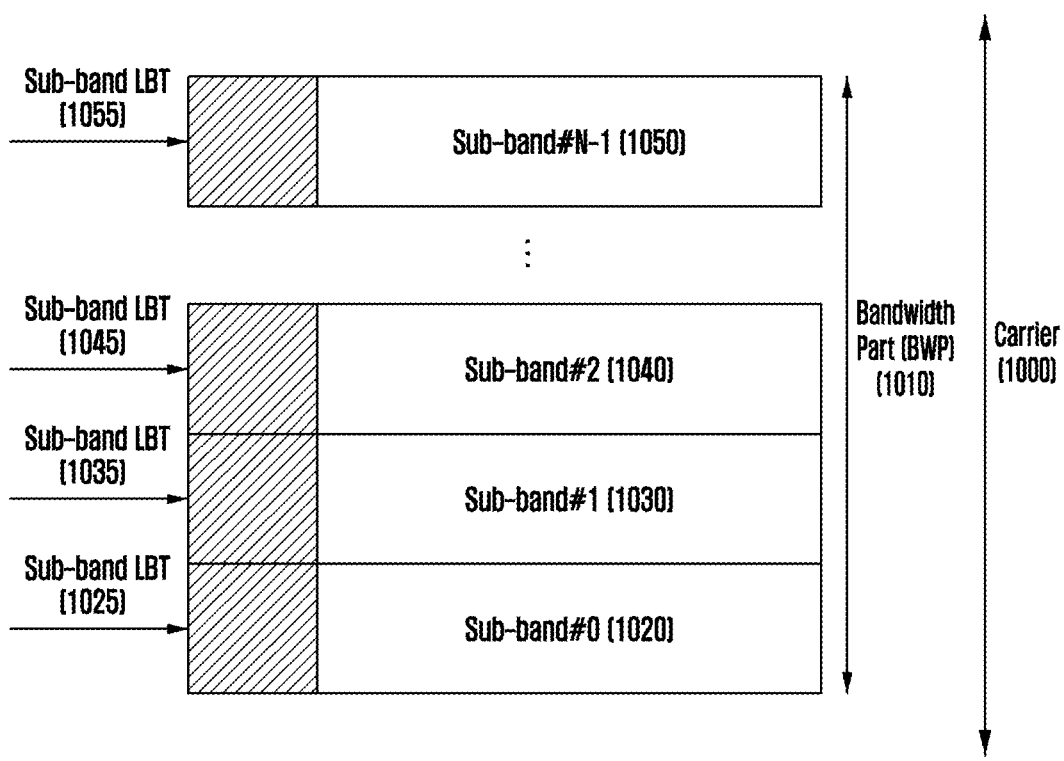
FIG. 10 illustrates a diagram of an example of a case where a channel access procedure for a frequency band is performed for each subband in a wireless communication system according to various embodiments of the disclosure.

FIG. 10 illustrates a diagram of an example of a case where a channel access procedure for a frequency band is performed for each subband in a wireless communication system according to various embodiments of the disclosure.

In 7 GHz frequency band or frequency band that is equal to or lower than the 7 GHz frequency band being considered in the 5G communication system, one carrier may use a maximally 100 MHz frequency band. In this case, a terminal may perform communication with a base station using a part of a carrier frequency band (hereinafter, bandwidth part (BWP), and the bandwidth part may be configured by the base station through a higher signal.

The base station and the terminal performing communication using an unlicensed band may perform a channel access procedure for an unlicensed band before transmitting a signal through the unlicensed band. In this case, the 5 GHz neighboring unlicensed band has been divided into channels in the unit of 20 MHz, and various communication devices may perform the channel access procedure with respect to the channels divided in the unit of 20 MHz, and they may perform communication using the unlicensed band. Accordingly, if the communication device intends to perform communication through the unlicensed band in the 5G communication system capable of using the broadband, it is preferable that the communication device performs the channel access procedure in the unit of 20 MHz. If the communication is performed through the unlicensed band in a state where the base station and the terminal perform communication using a bandwidth part 1010 of a carrier 1000, the base station and the terminal may divide the bandwidth part 1010 into at least one subband, and they may perform the channel access procedure with respect to each subband.

FIG. 10 illustrates an example of a case where the bandwidth part 1010 is divided into N subbands, and the channel access procedure is performed with respect to the divided subbands. In this case, in accordance with the bandwidth of the bandwidth part 1010 and the subcarrier spacing, the size of the subbands constituting the bandwidth part 1010 (or the number of PRBs) and start/end frequency domain information may be changed. Accordingly, in the following description, the disclosure proposes a method for configuring the size of the subbands constituting the bandwidth part and the start/end frequency domain of the respective subbands in accordance with the size of the bandwidth part and the subcarrier spacing, and through this, the disclosure proposes a method by the terminal for properly receiving the PDSCH or transmitting the PUSCH.

Embodiment 1

Embodiment 1 proposes a method for configuring the size of subbands in the case where the base station and the terminal performing communication using the unlicensed band divide the carrier, the bandwidth, or the bandwidth part into a plurality of subbands, and they perform communication through performing of the channel access procedure for each of the subbands.

For example, in the case of the carrier having the bandwidth of 40 MHz and the bandwidth part having the size of 40 MHz, the base station and the terminal may perform communication using maximally 106 PRBs. Table 5 shows an example of the number of PRBs capable of performing communication in accordance with the sizes of the carrier and the bandwidth part and the subcarrier spacing.

TABLE 5

| SCS (kHz) | 20 MHz | 40 MHz | 80 MHz |
|---|---|---|---|
| 15 | 106 | 216 | — |
| 30 | 51 | 106 | 217 |
| 60 | 24 | 51 | 107 |

In the case where the communication is performed through the unlicensed band and the base station and the terminal divide the bandwidth part into at least one subband and perform the channel access procedure for each subband, a method for configuring a subband size (or bandwidth), subband carrier spacing, and subband start/end frequency information is necessary. Accordingly, a method by the base station and the terminal for configuring the subband size (or bandwidth), the subband carrier spacing, and the subband start/end frequency information is hereinafter proposed. Hereinafter, the subband means a bandwidth for performing the channel access procedure in the case where the base station and the terminal perform the unlicensed band communication.

Method 1-1: This method configures the subband size for the bandwidth part using a subband of a reference size and reference subcarrier spacing.

More specifically, method 1-1 determines the size of the bandwidth part of the subband for performing the channel access procedure using a specific size and a specific subcarrier spacing regardless of the size of the bandwidth and the subcarrier spacing being actually used for the base station and the terminal to perform communication in order to fairly share and use the unlicensed band with various devices.

In this case, the reference subband size and the reference subcarrier spacing may be defined through various methods. For example, the subband size may be defined to be equal to the size of the unlicensed band channel. That is, the size of the reference subband may be defined as 20 MHz that is equal to the bandwidth of the unlicensed band channel. In this case, as the reference subcarrier spacing, the smallest subcarrier spacing or the largest subcarrier spacing among subcarrier spacings being supported in the communication system may be used.

For example, in the case of performing communication in the unlicensed band that is equal to or lower than 7 GHz in the NR communication system, subcarrier spacing of 15 kHz, 30 kHz, or 60 kHz can be used, and thus the reference subcarrier spacing can be defined using one of 15 kHz and 60 kHz. However, the disclosure is not limited thereto, and the reference subcarrier spacing may be determined by base station configuration, a predetermined value, or a predetermined reference among the subcarrier spacings being supported in the communication system.

For example, in the case where the smallest subcarrier spacing (e.g., usage of 15 kHz subcarrier spacing) among the subcarrier spacings being supported in the communication system is used as the subcarrier spacing for defining the subband size, it may be determined that 106 PRBs correspond to the subband size. In this case, because the channel access procedure is performed with respect to the frequency band having the widest range among the reference subband sizes, the channel access performance of the NR communication system may be somewhat lowered, but the unlicensed band can be shared and used more fairly with various devices.

Further, in the case where the largest subcarrier spacing (e.g., usage of 60 kHz subcarrier spacing) among the subcarrier spacings being supported in the communication system is used as the subcarrier spacing for defining the subband size, it may be determined that 24 PRBs correspond to the subband size.

As described above, because it is possible to perform the channel access procedure with respect to the frequency band having the same size or ratio regardless of the subcarrier spacing being actually used for the base station and the terminal to perform the communication, the unlicensed band can be fairly used with the NR communication system having various subcarrier spacings.

For example, in the case of determining the subband using the largest subcarrier spacing among the subcarrier spacings being supported in the communication system, the reference subband size and the frequency band range for performing the channel access procedure therefor are shown in Table 6 below.

TABLE 6

| SCS (kHz) | Subband (PRB) | Ratio |
|---|---|---|
| 15 | 96 PRBs | 86.4% |
| 30 | 48 PRBs | |
| 60 | 24 PRBs | |

Here, the ratio is a ratio of the subband size in accordance with the subcarrier spacing to 20 MHz channel size. According to Table 6, it can be identified that the ratios of the subband size for performing the channel access procedure in accordance with the subcarrier spacing to the 20 MHz channel size are equal to each other regardless of the subcarrier spacing. Accordingly, even in the case of using 60 kHz subcarrier spacing, it is apparent to share and use the unlicensed band more fairly with various devices in addition to the NR communication system.

Method 1-2: This method configures the subband size using the subcarrier spacing of the bandwidth part that performs communication with respect to the subband having a reference size.

For example, the subband size may be defined to be equal to the size of the unlicensed band channel. That is, the reference subband size may be defined as 20 MHz that is equal to the bandwidth of the unlicensed band channel. In this case, the reference subcarrier spacing may be defined to be equal to the subcarrier spacing of the bandwidth part to be used for communication in the communication system. In the case of performing communication in the unlicensed band that is equal to or lower than 7 GHz in the NR communication system, the subcarrier spacing of 15 kHz, 30 kHz, or 60 kHz can be used, and thus the subband sizes according to methods 1 and 2 are shown in Table 7 below.

TABLE 7

| SCS (kHz) | Subband (PRB) | Ratio |
|---|---|---|
| 15 | 106 PRBs | 95.4% |
| 30 | 51 PRBs | 91.8% |
| 60 | 24 PRBs | 86.4% |

Here, the ratio is a ratio of the subband size in accordance with the subcarrier spacing to 20 MHz channel size. In the case of methods 1 and 2, the subcarrier spacing of the subband is equal to the subcarrier spacing actually used for the base station and the terminal to perform the communication, and thus it is easy to divide the bandwidth part into a plurality of subbands.

Method 1-3: This method configures the subband size using the size of the bandwidth part for performing the communication and the subcarrier spacing.

More specifically, method 1-3 will be described in more detail. In method 1-3, the subcarrier spacing for defining the subband size is defined to be equal to the subcarrier spacing of the bandwidth part intended to be used for the communication in the communication system. Unlike method 1-2, method 1-3 is a method for defining the subband size through averagely equally dividing the bandwidth part intended to be used for the communication. In this case, in order to equally dividedly define the bandwidth part, the subband sizes defined in at least method 1-1 and method 1-2 may be used. For example, in determining the number of subbands constituting the bandwidth part, the subband sizes defined in method 1-1 and method 1-2 may be used. Further, at least one of the subband sizes may be equal to the subband size defined in method 1-1 and method 1-2.

More specifically, it is assumed that the base station and the terminal intend to perform communication using a 40 MHz bandwidth part of 30 kHz subcarrier spacing. In this case, the bandwidth part is composed of 106 PRBs, and in the case of using methods 1 to 3, the 106 PRBs may be discriminated into two subbands, and thus each of the two subbands is composed of 53 PRBs. In this case, one or more PRBs may be further included in at least one subband (e.g., subband having the lowest subband index, subband having the highest subband index, or subband in accordance with a predetermined condition) among the subbands of the bandwidth part. For example, if 105 PRBs constitute the bandwidth part, subband #1 may be composed of 53 PRBs, and subband #1 may be composed of 52 PRBs. In this case, it is also possible that subband #1 is composed of 52 PRBs, and subband #1 is composed of 53 PRBs. In the case of methods 1 to 3, it is possible to perform the channel access procedure with respect to the entire bandwidth part intended to perform the communication, and thus all PRBs may be used for the communication in accordance with the result of the channel access procedure regardless of whether to configure the subband.

More specifically, the number of subbands may be calculated as N=min (Nmax, C) from the number C of PRBs constituting the bandwidth part intended to perform the communication. In this case, Nmax is the maximum number of subbands, and it may be predefined between the base station and the terminal, or it may be configured from the base station to the terminal through the higher signal. In this case, as another method, the number of subbands may be calculated through N=floor (C/Nref). Here, Nref may be the size of the reference subband or the minimum subband that performs the channel access procedure determined through methods 1-1 to 1-2. Nref may be predefined between the base station and the terminal, or it may be configured from the base station to the terminal through the higher signal. Further, it is also possible to calculate the number of subbands through N=ceiling (C/Nref).

In this case, N or Nmax may be differently defined or configured in accordance with the size of the bandwidth part. In this case, in the order of subband indexes, each of the first (N1=mod (C, N))-numbered subbands may be composed of ceiling (C/N)-numbered PRBs, and each of the last (N2=N-mod (C, N))-numbered subbands may be composed of flooring (C/N)-numbered PRBs. In this case, it is also possible that each of the first (N1=mod (C, N))-numbered subbands may be composed of flooring (C/N)-numbered PRBs, and each of the last (N2=N-mod (C, N))-numbered subbands may be composed of ceiling (C/N)-numbered PRBs.

Hereinafter, the bandwidth part having the size of 80 MHz and the subcarrier spacing of 30 kHz will be exemplarily described using FIG. 10.

It is assumed that FIG. 10 illustrates a frequency resource region in a carrier and a bandwidth part (hereinafter, bandwidth part) using 30 kHz subcarrier spacing in a wireless communication system according to various embodiments of the disclosure.

If the bandwidth part 1010 is composed of 217 PRBs, it may be composed of 4 (N=floor (217/51)=4) subbands (N=4). In this case, it is exemplified that the subband size determined by methods 1-1 to 1-2 or the subband size predefined between the base station and the terminal or configured from the base station to the terminal through the higher signal is 51 PRBs. Accordingly, one (N1=mod (217, 4)=1) first subband (subband #0 1020) may be composed of 55 (ceiling (217/4)=55) PRBs, and each of 3 (N2=4-mod (217, 4)=3) remaining subbands (subband #1 1030, subband #2 1040, and subband #3 1050) may be composed of 54 (flooring (217/4)=54) PRBs. The above-described methods are methods for maximally equally distributing the subband size with respect to the bandwidth part.

In this case, it is also possible to differently distribute only one subband size for the bandwidth part. For example, in the above-described example, it may be also possible that each of subband #0 1020, subband #1 1030, and subband #2 1040 is composed of 51 PRBs in all, and subband #3 1050 is composed of 64 PRBs.

Further, in order to determine the subband size, one predetermined method among the above-described methods may be used, or a method for configuring a method to be used through RRC signaling or a control signal may be used.

Embodiment 2

Embodiment 2 proposes a method for configuring a frequency axis location of subbands configured or determined in embodiment 1 in the case where the base station and the terminal performing communication using the unlicensed band divide the carrier, the bandwidth, or the bandwidth part into a plurality of subbands, and they perform communication through performing of the channel access procedure for each of the subbands.

Figure 11:
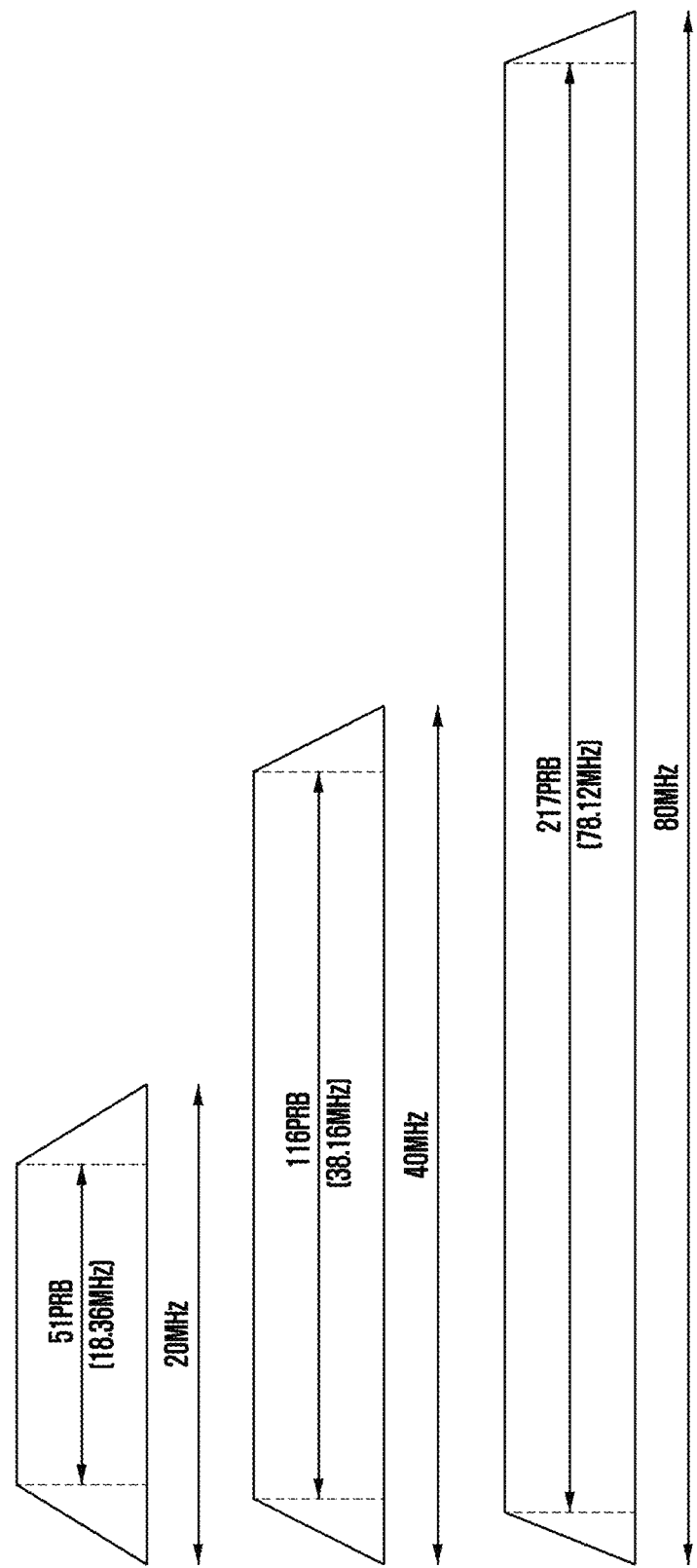
FIG. 11 illustrates a diagram of an example of a bandwidth of a bandwidth part in a wireless communication system according to various embodiments of the disclosure.

With reference to Table 5 in embodiment 1, an example of the number of PRBs capable of performing communication with respect to the size of the carrier and the bandwidth part and the subcarrier spacing is illustrated on the frequency axis as illustrated in FIG. 11.

FIG. 11 illustrates frequency resources and PRBs for constituting 20 MHz, 40 MHz, and 80 MHz bands based on 30 kHz subcarrier spacing. As illustrated in FIG. 11, as the bandwidth size is increased based on one subcarrier spacing, the number of usable PRBs is also increased. Frequency axis information (e.g., PRB start/end index, start index, and subband size) of the bandwidth or bandwidth part (hereinafter, bandwidth part) in which subbands determined through at least one of various methods according to embodiment 1 should be additionally defined or configured. This will be described hereinafter through FIG. 12.

Figure 12:
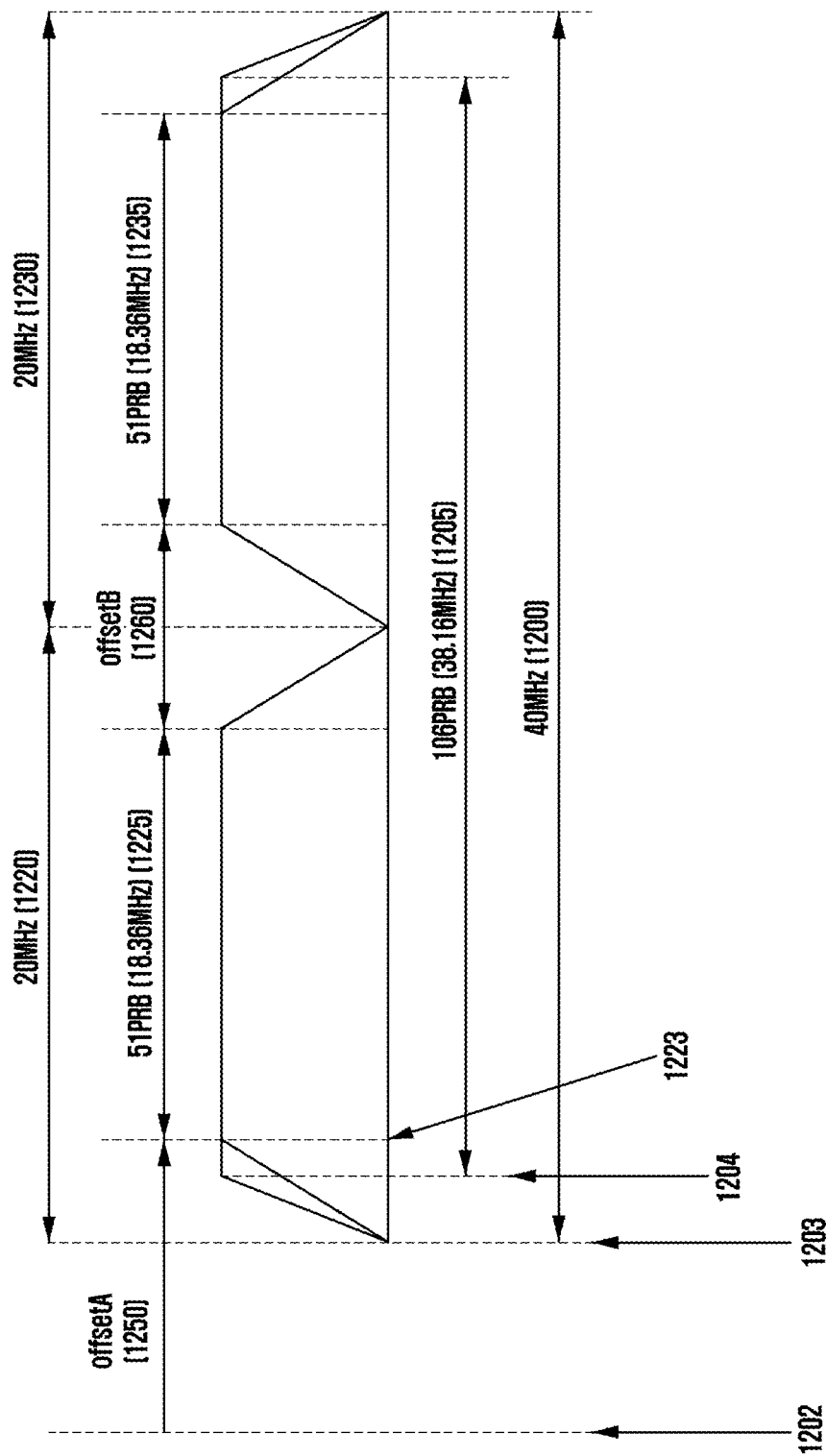
FIG. 12 illustrates a diagram of an example of a case where a bandwidth part is divided into a plurality of subbands in a wireless communication system according to various embodiments of the disclosure.

FIG. 12 illustrates a diagram of an example of a case where a bandwidth part is divided into a plurality of subbands in a wireless communication system according to various embodiments of the disclosure.

Specifically, FIG. 12 illustrates a case where 40 MHz bandwidth part 1200 having 30 kHz subcarrier spacing is divided into two subbands 1220 and 1230 having a size of 20 MHz.

In this case, the method 1-2 according to embodiment 1 has been assumed as a method for determining the subband size. That is, although explanation will be made on the assumption that the subband of the 20 MHz bandwidth is composed of 51 PRBs 1225 and 1235, the embodiment of the disclosure is not limited thereto. In this case, because the 40 MHz bandwidth part is composed of 106 PRBs 1205, it should be correctly defined what frequency resource region of the bandwidth part composed of 106 PRBs two subbands composed of the 51 PRBs are located in. For this, the embodiment proposes a method for determining the frequency resource region of the subband.

Hereinafter, method 2-1 will be described in more detail using FIG. 12. A base station that divides a bandwidth part into subbands and performs a channel access procedure for the divided subbands may configure a start frequency resource region location of the subband in the bandwidth part, and it may transmit the configured location to a terminal. In this case, information on the start frequency resource region location of the subband may be transmitted to the terminal through a higher signal. In this case, the higher signal may include an RRC message or an SIB. The information may include at least one of offset information between a specific reference point (e.g., point A 1202) and a subband start frequency resource 1223, offset information between the specific reference point and a bandwidth part start frequency resource 1204, offset information between the subband start frequency resource 1223 and the bandwidth part start frequency resource 1204, or offset information between subbands (offset B 1260), and the information may be determined in the unit of a PRB or subcarrier.

For example, the offset information may include offset information between a frequency excluding the bandwidth part 1200 configured by the base station to perform communication with the terminal, for example, an absolute frequency value 1202 of point A 1202 or point A expressed by an absolute radio-frequency channel number (ARFCN), and the subband start frequency resource 1223, offset information between the specific reference point and the bandwidth part start frequency resource 1204, or offset information between the subband start frequency resource 123 and the bandwidth part start frequency resource 1204.

Further, the offset information may include offset information between the lowest frequency 1203 among the bandwidth part 1200 configured by the base station to perform communication with the terminal and the subband start frequency resource 1223.

Further, the offset information may include offset information between the PRB 1204 having the lowest index among the frequency resource region effective to the communication among the bandwidth part 1200 configured by the base station to perform communication with the terminal or the first subcarrier 1204 of the PRB and the subband start frequency resource 1223.

Here, the point A is a reference point acquired from a synchronization signal block (SS/PBCH block) through offsetToPointA information, and the offsetToPointA is offset information in the unit of the PRB. In this case, the offsetToPointA is offset information in the unit of the PRB expressed by 15 kHz or 60 kHz subcarrier spacing, and the subcarrier spacing is selected in accordance with the frequency band. For example, in the case of frequency band 1 (that is equal to or lower than 6 GHz frequency band, and is equal to or lower than 7 GHz band in the case of including the unlicensed band), the offsetToPointA may include offset information in the unit of the PRB expressed by 15 kHz subcarrier spacing, and in the case of frequency band 2, the offsetToPointA may include offset information in the unit of the PRB expressed by 60 kHz subcarrier spacing. That is, the terminal may determine that the frequency before the offsetToPointA is point A from the lowest subcarrier of the lowest PRB of the detected synchronization signal block. That is, the frequency after the offsetToPointA becomes the frequency of the lowest subcarrier of the lowest PRB of the synchronization signal received by the terminal from point A.

If a plurality of subbands exist in the bandwidth part, the base station may additionally configure offset information (offsetB) 1260 between successive subbands to the terminal. In this case, the offset information (offsetB) 1260 may be in the unit of the subcarrier or PRB, or it may be expressed by at least one of absolute frequency values. The offset may be a value for performing a role of a guard interval for minimizing inter-subband interference, and it may expressed as a guard band or intra-band guard band.

That is, the terminal may be configured with the subband size through one of various methods according to embodiment 1 of the disclosure, and it may be additionally configured with offset information (offsetA) 1250 that is information used to indicate the subband start frequency information and offset information (offset) 1260 between successive subbands through a higher signal from the base station. The terminal may determine the subband frequency location in the bandwidth part using the subband size, the offset information (offsetA) 1250 indicating the subband start frequency information, and the offset information (offset) 1260 between the successive subbands. Through this, the terminal may receive a downlink signal, and during transmission of an uplink signal, it may perform the channel access procedure with respect to the subband.

If the terminal performs the channel access procedure with respect to the respective subbands for uplink transmission, it is preferable to equally match the subband frequency region locations between terminals. In other words, because one or more terminals configured with the uplink transmission perform the channel access procedure at the same time and with respect to the same frequency domain, the terminals can equally access the channel. That is, in the case where the terminal performs the channel access procedure with respect to the respective subbands for the uplink transmission, it is effective to uplink signal transmission multiplexing of the terminals to equally match the subband frequency region locations between the terminals. Accordingly, as proposed in an embodiment of the disclosure, it is efficient that the base station transmits at least one of the subband size, the offset information (offsetA) 1250 indicating subband start frequency information, or the offset information (offset B) 1260 between successive subbands to the terminal through a higher signal including the SIB, and the terminal having received this determines the subband location in the bandwidth part. In this case, at least one of the offset information (offsetA) 1250 indicating the subband start frequency information and the offset information (offsetB) 1260 between the successive subbands may not be configured to the terminal. For example, if the subbands are successively located, the offsetB may not be configured to the terminal. In this case, it is also possible to configure the offsetB to 0.

As another example, if the subband start frequency information can be predefined based on one piece of frequency information of the bandwidth part for performing the communication, the offset information (offsetA) 1250 indicating the subband start frequency information may not be configured to the terminal. For example, if the subband location is predefined based on an absolute start frequency value 1203 of the bandwidth part 1200 of FIG. 12, or if the subband location is predefined based on the lowest PRB of an effective frequency band 1205 of the bandwidth part 1200 of FIG. 12 or the lowest subcarrier 1204 of the lowest PRB, the offset information (offsetA) 1250 indicating the subband start frequency information may not be configured to the terminal. Further, even in the above-described case, the offset information between a specific reference point and the absolute start frequency value 1203 or the offset information between the specific reference point and the PRB 1204 having the lowest index among the frequency resource region effective to the communication or the first subcarrier 1204 of the PRB may be configured to the terminal.

As still another example, an absolute value of the subband start frequency information 1223 may be configured to the terminal, and in this case, the offset information may not be transmitted to the terminal.

Further, as the above-described offsetB value, a predetermined value may also be used.

Embodiment 3

Embodiment 3 proposes a method for allocating radio resources in accordance with the subband size and the frequency axis location determined through embodiment 1 to embodiment 2 as described above in the case where the base station and the terminal performing communication using the unlicensed band divide the carrier, the bandwidth, or the bandwidth part into a plurality of subbands, and they perform communication through performing of the channel access procedure for each of the subbands. In particular, a resource allocation method by the base station is proposed in the case where the resource that is not included in the subband is unavoidably scheduled in accordance with an uplink/downlink data resource allocation scheme of the terminal. For example, in the case where the terminal is configured, through the higher signal, to use the resource allocation scheme capable of allocating only successive frequency resources, or the terminal is configured, through the higher signal, to use both a non-successive frequency resource allocation scheme and the successive frequency resource allocation scheme, but the terminal is indicated to use the successive frequency resource allocation scheme through scheduling information (DCI), the base station may unavoidably schedule the terminal with a resource (e.g., resource in offsetA or offset) that is not included in the subband. In this case, the terminal may determine the uplink/downlink frequency resource allocation as follows.

Figure 13A:
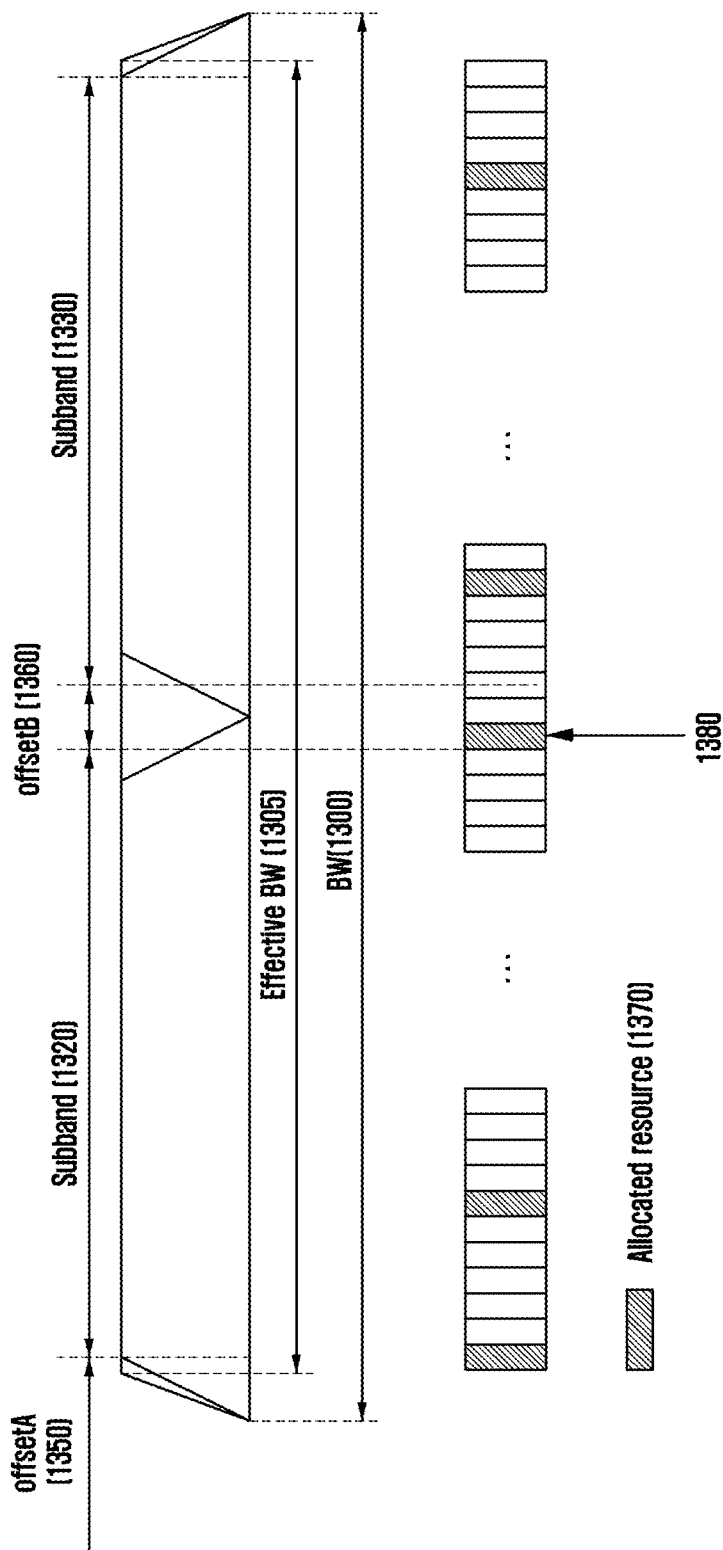
FIG. 13A illustrates a diagram of an example of determining PDSCH reception or PUSCH transmission resources being scheduled by a base station in an example of a case where a bandwidth part is divided into a plurality of subbands and a channel access procedure is performed with respect to each of the subbands in a wireless communication system according to various embodiments of the disclosure.

FIG. 13A illustrates a diagram of an example of determining PDSCH reception or PUSCH transmission resources being scheduled by a base station in an example of a case where a bandwidth part is divided into a plurality of subbands and a channel access procedure is performed with respect to each of the subbands in a wireless communication system according to various embodiments of the disclosure.

With reference to FIG. 13A, the base station and the terminal performing communication using a bandwidth part 1300 may divide the bandwidth part 1300 into subbands 1320 and 1330, and they may perform the channel access procedure with respect to the divided subbands 1320 and 1330. In this case, the size of the subbands 1320 and 1330 may be configured by one of various methods proposed in embodiment 1 of the disclosure, and the start frequency location of the subbands 1320 and 1330 may be configured by the method proposed in embodiment 2, for example, using at least one of offset information 1350 and 1360.

The terminal configured with the subbands with respect to the bandwidth part as described above may be scheduled with downlink signal reception or uplink signal transmission from the base station. As shown in FIG. 13A, if the terminal is scheduled with the downlink signal reception or the uplink signal transmission through a plurality of resources 1370, resource allocation information for a region 1380 that is not included in the subbands 1320 and 1330 may be included in the scheduling information. In the case of an example of FIG. 13A, the resource 1380 may correspond to the region 1380. In this case, the base station or the terminal does not perform the channel access procedure with respect to the corresponding frequency domain, and thus it may not perform the downlink signal reception or the uplink signal transmission in the corresponding frequency domain. In other words, if the terminal is configured with the bandwidth part and the subbands as shown in FIG. 13A and it is scheduled with the plurality of resources 1370 in the case where a signal is not transmitted or received with respect to the frequency domain in which the channel access procedure is not performed, the terminal may determine that the signal is not received or transmitted on the resource 1380 that is not included in the subband among the scheduled resources 1370. Accordingly, the terminal may assume that the downlink signal is punched and transmitted on the resource. In other words, the terminal may determine the downlink data size (transport block size) based on the scheduled resource, and it may determine that the downlink data signal has been punched and transmitted on the resource 1380 that is not included in the subband.

Similarly, the terminal may determine the uplink data size (transport block size) based on the scheduled resource, and the terminal may determine that the signal is punched on the resource 1380 that is not included in the subband and it may not transmit the uplink signal on the resource 1380.

Meanwhile, it is also possible that the terminal assumes that the downlink signal is rate-matched and transmitted on the resource. In other words, the terminal may determine the downlink data size (transport block size) based on the remaining resources excluding the resource 1380 that is not included in the subband among the scheduled resources, and it may determine that the downlink data signal is not transmitted on the resource 1380 that is not included in the subband.

Similarly, the terminal may determine the downlink data size (transport block size) based on the remaining resources excluding the resource 1380 that is not included in the subband among the scheduled resources, and it may not transmit the uplink data signal on the resource 1380 that is not included in the subband.

Embodiment 4

Embodiment 4 provides a method by a terminal for determining an offset between the subband size and/or successive subband in the case where the base station and the terminal performing communication in the unlicensed band divide the carrier, the bandwidth, or the bandwidth part into a plurality of subbands, and they perform communication through performing of the channel access procedure for each of the subbands. More specifically, embodiment 4 provides a method by a terminal, which performs, for example, an initial access before receiving configuration information through a higher signal, for determining the subband size and/or offset information between successive subbands if the terminal is configured with at least one of the subband size and/or the offset between the successive subbands from the base station through a higher signal.

For example, if the offset information (offsetB) between the successive subbands is not provided from the base station or before the information is configured through the higher signal (e.g., in the case of performing the initial access), the terminal may assume that the offset information between the successive subbands is the offset information between the successive subbands, which is predefined between the base station and the terminal, and it may use the offset information. Through this, the terminal may determine the subband size and/or the location in the configured bandwidth part or initial uplink/downlink bandwidth part (initial DL/UL BWP).

If the terminal is provided with the offset information (offsetB) between the successive subbands from the base station, or if the terminal receives configuration information including the information through the higher signal, the terminal may determine the subband size and/or location using the offset information (offsetB) between the successive subbands configured through the higher signal.

Here, the offset information (offset) between the successive subbands may be a value in the unit of a subcarrier or a PRB, and it may include at least one of the size of an offset between successive subbands (the number of subcarriers or PRBs), offset start subcarriers or PRB indexes between the successive subbands, or offset end subcarriers or PRB index information between the successive subbands.

The offset between the successive subbands may be differently defined in accordance with at least one of the channel bandwidth size, subcarrier spacing, or frequency band, and Table 8 shows an example of an offset between successive subbands. Here, Table 8 shows values of expressing the offset between successive subbands predefined between the base station and the terminal in accordance with respective channel bandwidths and subcarrier spacings. That is, the values express the offset using the size of a guard band that is minimally required to minimize inter-subband interference, and the unit thereof is kHz. In this case, it is also possible to express the offset as the minimum number of subcarriers or PRBs having the spacing that is equal to or larger than the values of Table 8. For example, the size of the minimum guard band in 40 MHz channel bandwidth and 30 kHz subcarrier spacing is 905 kHz, and this is converted into 4 PRBs in the unit of PRBs. Here, because the minimum guard band is located at both ends of the channel bandwidth, two minimum guard bands are located at both ends of the channel bandwidth.

TABLE 8

Offset or minimum value between minimum successive subbands

| SCS (kHz) | 5 MHz | 10 MHz | 15 MHz | 20 MHz | 25 MHz | 30 MHz | 40 MHz | 50 MHz | 60 MHz | 80 MHz | 90 MHz | 100 MHz |
|---|---|---|---|---|---|---|---|---|---|---|---|---|
| 15 | 242.5 | 312.5 | 382.5 | 452.5 | 522.5 | 592.5 | 552.5 | 692.5 | N/A | N/A | N/A | N/A |
| 30 | 505 | 665 | 645 | 805 | 785 | 945 | 905 | 1045 | 825 | 925 | 885 | 845 |
| 60 | N/A | 1010 | 990 | 1330 | 1310 | 1290 | 1610 | 1570 | 1530 | 1450 | 1410 | 1370 |

With reference to FIG. 12, an example of embodiment 4 will be described hereinafter. In the channel bandwidth or bandwidth part, if the terminal is not provided with subband spacing (offset) information from the base station, or before the information is configured through the higher signal (e.g., in the case of performing an initial access), the terminal may identify the offset information between the successive subbands that is predefined between the base station and the terminal (in the case of the above-described example, 4 PRBs may be assumed). That is, in the channel bandwidth or bandwidth part 1200 composed of 106 PRBs as shown in FIG. 12, the terminal may determine that the inter-subband spacing is 4 PRBs, and the terminal may determine that the subband size or an effective number of PRBs of the subband is 51 PRBs. In other words, the terminal performing the initial access operation may determine that the subband size, the size of the initial uplink bandwidth part, or the size of the initial downlink bandwidth part is 51 PRBs, and it may determine, through the above-described values, the size of a field of frequency resource allocation information of the DCI or RAR grant and/or the frequency allocation resource region information.

For example, in the case of using a frequency resource allocation scheme for allocating the frequency resources for transmitting uplink/downlink signals or channels so that the frequency resource is distributed over the whole of the activated uplink bandwidth part, the resource is allocated to be uniformly distributed over the whole frequency band, and thus it may be limitedly applied during transmission of the uplink/downlink signal and channel being transmitted in the carrier, cell, or bandwidth part that is operated in the unlicensed band that requires satisfaction of the requirements on the frequency allocation, such as power spectral density (PSD) requirements or occupancy channel bandwidth (OCB) conditions.

Figure 8B:
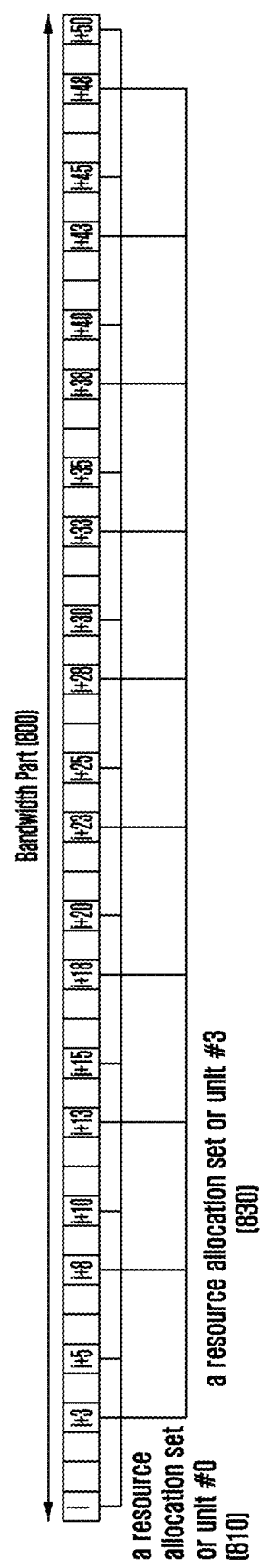
FIG. 8B illustrates a diagram of a method for allocating frequency resources in a wireless communication system according to various embodiments of the disclosure.

This will be described hereinafter as exemplified in FIG. 8B. FIG. 8B illustrates a diagram of a case in which the terminal is configured to perform uplink/downlink transmission and reception with the base station through a bandwidth part 820, and it is scheduled with uplink/downlink data channel transmission through a resource allocation scheme. In FIG. 8B, it is assumed that the bandwidth part 820 is composed of 51 PRBs, but this is merely exemplary. In accordance with the resource allocation scheme, the 51 PRBs constitute L (in FIG. 8B, L=5) resource region sets 810, and each resource region set may be composed of $$N = \left\lfloor \frac{N_{BWP}}{L} \right\rfloor \text{ or } N = \left\lfloor \frac{N_{BWP}}{L} \right\rfloor + 1$$

numbered PRBs. In FIG. 8B, the first resource region set 810 may be composed of 11 PRBs #i, #i+5, #i+10, #i+15, . . . , #i+45, and #i+50, and the remaining resource region set, for example, the third resource region set 830, may be composed of 10 PRBs #i+3, #i+8, #i+13, #i+18, . . . , and #i+48. In other words, the number of PRBs included in the resource region set may differ in accordance with the size of the bandwidth part or the number of PRBs of the bandwidth part. The terminal may be allocated with one or more resource region sets configured as described above, and it may be allocated with a successive resource region sets (e.g., resource region sets #0, #1 or #2, #3, #4) or successive or non-successive resource region sets in a similar manner to an uplink resource allocation type 0 (e.g., allocation based on a bit map).

If the terminal is provided with offset (offsetB) information between successive subbands from the base station, or it receives configuration information including the information through a higher signal, the terminal may determine the subband size and/or location using the offset (offsetB) information between the successive subbands configured through the higher signal. If it is configured that the offset between the successive subbands is 6 PRBs, the terminal may determine that the subband size or an effective number of PRBs of the subbands, and it may determine that the subband size or the effective number of PRBs of the subbands is 50 PRBs.

Accordingly, in the case of using a scheme for allocating the frequency resource for transmitting an uplink/downlink signal or channel so that the frequency resource is distributed over the whole of the activated uplink bandwidth part, it is featured that distances or spacings between the allocated frequency resources are the same or equal to each other. The resource is allocated to be uniformly distributed over the whole frequency band, and thus it may be limitedly applied during transmission of the uplink/downlink signal and channel being transmitted in the carrier, cell, or bandwidth part that is operated in the unlicensed band that requires satisfaction of the requirements on the frequency allocation, such as power spectral density (PSD) requirements or occupancy channel bandwidth (OCB) conditions. In this case, the terminal may determine the subband size or bandwidth part size and that the corresponding effective number of PRBs is 50. It may be determined that the first resource region set 810 is composed of 10 PRBs #i, #i+5, #i+10, #i+15, . . . , and #i+45, and the remaining resource region set, for example, the third resource region set 830, may is composed of 10 PRBs #i+3, #i+8, #i+13, #i+18, . . . , and #i+48.

In the case where at least one of the subband size and/or an offset between the successive subbands is configured through the higher signal, embodiment 4 can be applied to not only the method by the terminal performing, for example, the initial access for determining the subband size and/or the offset between the successive subbands before the configuration information is configured through the higher signal but also the method by the terminal for determining the subband size and/or the offset between the successive subbands in accordance with the DCI format.

For example, in the case of an uplink/downlink data channel (e.g., PDSCH or PUSCH) scheduled through fallback DCI (e.g., DCI format 0_0 or DCI format 1_0) or an uplink control channel including HARQ-ACK information for the downlink channel scheduled through the fallback DCI, the terminal may determine the subband size and/or location using offset information between predefined successive subbands. In the case of an uplink/downlink data channel (e.g., PDSCH or PUSCH) scheduled through non-fallback DCI (e.g., DCI format 0_1 or DCI format 1_1) or an uplink control channel including HARQ-ACK information for the downlink channel scheduled through the non-fallback DCI, the terminal may determine the subband size and/or location using offset (offsetB) information between successive subbands configured through the higher signal.

In the case where at least one of the subband size and/or an offset between the successive subbands is configured through the higher signal, embodiment 4 can be applied to not only the method by the terminal performing, for example, the initial access for determining the subband size and/or the offset between the successive subbands before the configuration information is configured through the higher signal but also the method by the terminal for determining the subband size and/or the offset between the successive subbands in accordance with the search space type for transmitting the DCI.

For example, in the case of an uplink/downlink data channel (e.g., PDSCH or PUSCH) scheduled with the DCI transmitted through a common search space or an uplink control channel including HARQ-ACK information for the downlink channel scheduled with the DCI transmitted through the common search space, the terminal may determine the subband size and/or location using offset information between predefined successive subbands. In the case of an uplink/downlink data channel (e.g., PDSCH or PUSCH) scheduled with the DCI transmitted through a UE specific search space or an uplink control channel including HARQ-ACK information for the downlink channel scheduled with the DCI transmitted through the UE specific search space, the terminal may determine the subband size and/or location using offset (offsetB) information between successive subbands configured through the higher signal.

In this case, in the case of an uplink/downlink data channel (e.g., PDSCH or PUSCH) scheduled with fallback DCI transmitted through a common search space or an uplink control channel including HARQ-ACK information for the downlink channel scheduled with the fallback DCI transmitted through the common search space, the terminal may determine the subband size and/or location using offset information between predefined successive subbands. In the case of an uplink/downlink data channel (e.g., PDSCH or PUSCH) scheduled with non-fallback DCI transmitted through the common search space or the fallback DCI or the non-fallback DCI transmitted through a UE specific search space or an uplink control channel including HARQ-ACK information for the downlink channel scheduled with the non-fallback DCI transmitted through the common search space or the fallback DCI or the non-fallback DCI transmitted through the UE specific search space, the terminal may determine the subband size and/or location using offset (offsetB) information between successive subbands configured through the higher signal.

In the case where the base station and the terminal performing communication using the unlicensed band divide the carrier, the bandwidth, or the bandwidth part for performing the communication into a plurality of subbands, and perform communication through performing of the channel access procedure for each of the subbands, radio resources effective to transmission and reception in accordance with the subband size, inter-subband spacing, and their frequency locations determined through various embodiments of the disclosure and a combination of the embodiments may be determined as follows. In particular, the base station may schedule the resource that is not included in the subband, for example, the resource included in the inter-subband spacing, in accordance with the uplink/downlink data resource allocation scheme of the terminal.

For example, in the case where the terminal is configured to use resource allocation capable of allocating only successive frequency resources through the higher signal, in the case where the terminal is configured, through the higher signal, to use both a non-successive frequency resource allocation scheme and the successive frequency resource allocation scheme, but the terminal is indicated to use the successive frequency resource allocation scheme through scheduling information (DCI), or the terminal is indicated to use the frequency resource allocation scheme equally allocated at predetermined PRB intervals, the base station may unavoidably schedule the terminal with a resource that is not included in the subband.

This will be described in more detail through FIG. 13B.

Figure 13B:
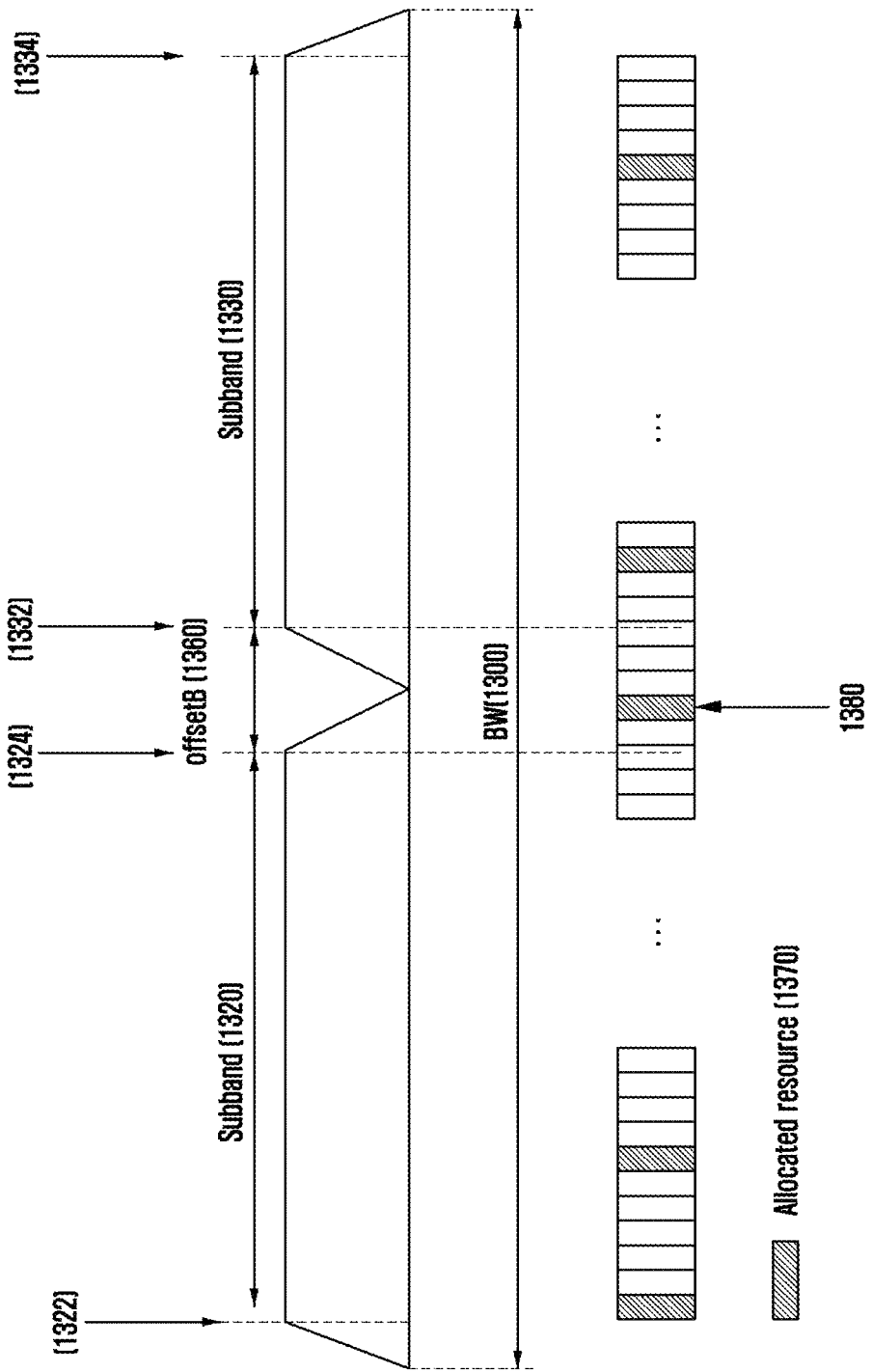
FIG. 13B illustrates a diagram of an example of determining PDSCH reception or PUSCH transmission resources being scheduled by a base station in an example of a case where a bandwidth part is divided into a plurality of subbands and a channel access procedure is performed with respect to each of the subbands in a wireless communication system according to various embodiments of the disclosure.

FIG. 13B illustrates an example of determining PDSCH reception or PUSCH transmission resources being scheduled by the base station in an example of a case where a bandwidth part is divided into a plurality of subbands and a channel access procedure is performed with respect to each of the subbands in a wireless communication system according to various embodiments of the disclosure.

With reference to FIG. 13B, the base station and the terminal performing communication using a bandwidth part 1300 may divide the bandwidth part 1300 into subbands 1320 and 1330, and they may perform the channel access procedure with respect to the divided subbands 1320 and 1330. In this case, the size of the subbands 1320 and 1330 may be configured by one of various methods proposed in the disclosure, and the start frequency location of the subbands 1320 and 1330 and the end frequency location may also be determined through various embodiments of the disclosure.

For example, the start frequency location and the end frequency location of the subbands 1320 and 1330 may be determined using the start frequency location of each subband and the corresponding PRB index, and the end frequency location and the corresponding PRB index information. As another example, the terminal may determine the start frequency locations 1322 and 1332 of the subbands 1320 and 1330 and the end frequency locations 1324 and 1334 through the subcarrier spacing, the size of the bandwidth part, inter-subband spacing, and location information. As still another example, the terminal may determine the start frequency locations and end frequency locations of the subbands 1320 and 1330 through the subcarrier spacing, the size of the bandwidth part, the subband size, and the location information.

If the terminal is scheduled with the downlink signal reception or uplink signal transmission through a plurality of resources 1370 as shown in FIG. 13B, the scheduling information may include resource allocation information for a region that is not included in the subbands 1320 and 1330 and resource allocation information included in an interval of the offset 1360 between the successive subbands. In the case of an example of FIG. 13B, the resource 1380 may correspond to the information. In this case, because the base station or the terminal does not perform the channel access procedure with respect to the corresponding frequency domain, or the corresponding frequency domain is a resource that is used as a guard band, the downlink signal reception or the uplink signal transmission is not performed in the corresponding frequency domain 1360, or the corresponding frequency domain 1360 may be determined as a resource that is ineffective to the downlink signal reception or the uplink signal transmission. For example, if the base station and the terminal has failed the channel access with respect to one of the subbands 1320 and 1330 (if it is determined as a non-idle channel), the offset 1360 between the successive subbands is to be used as the guard band. Accordingly, the terminal may not perform the downlink signal reception or the uplink signal transmission in the frequency domain 1360, or the corresponding frequency domain 1360 may be determined as the resource that is not effective to the downlink signal reception or the uplink signal transmission. In this case, the base station may transmit the carrier of the base station and/or information on the result of performing the subband channel access procedure through the DCI being transmitted through a downlink control channel, for example, a group common control channel. Here, transmission of the information on the result of performing the channel access procedure to the terminal is equal to notifying the terminal of availability for each subband or LBT success/failure for the subband, and it may be expressed as bitmap information.

Further, the terminal may identify whether the received DCI is the first DCI received in the channel occupancy interval or the first slot in the channel occupancy interval of the base station, and if the received DCI is the first DCI or the first slot, the terminal may determine that the resource having succeeded in the LBT (e.g., resource 1320 and/or 2330 in the subband having succeeded in the LBT) is an effective resource or it may determine that the resource excluding the offsetA and/or offsetB is an effective resource using the information on the result of performing the channel access procedure, whereas if the received DCI is not the first DCI or the first slot, it may determine that the scheduled resources are all effective resources. This is because only the effective resource can be scheduled in accordance with the LBT success/failure after the first DCI or the first slot.

Further, in order to determine whether the DCI received by the terminal is the first DCI or whether the DCI is the first slot of the channel occupancy interval of the base station, one-bit information may be additionally included in the DCI or the information may be transmitted through separate signaling. Further, information on the channel occupancy time may be included in the DCI, and using the information, the terminal may identify whether the received DCI is the first DCI.

As described above, explanation has been made on the assumption that an effective resource is differently determined depending on whether the received DCI is the first DCI or the first slot in the channel occupancy interval of the base station. However, it is also possible to determine the effective resource depending on whether K1 pieces of DCI have arrived from the first DCI or whether K2 slots have arrived from the first slot of the channel occupancy interval of the base station. In this case, the values K1 and K2 may be configured by the base station through a higher signal, or they may be predefined values.

On the other hand, if the base station or the terminal has succeeded in the channel access in the subbands 1320 and 1330, it is not necessary for the offset 1360 between the successive subbands to be used as the guard band, and thus the terminal may perform the downlink signal reception or uplink signal transmission in the frequency domain 1360, or it may determine the corresponding frequency domain 1360 as the resource effective to the downlink signal reception or the uplink signal transmission. In this case, the terminal may receive the carrier of the base station and/or the information on the result of performing the subband channel access procedure through the DCI transmitted through the downlink control channel, for example, through the group common control channel. Here, the transmission of the information on the result of performing the channel access procedure to the terminal is equal to notifying the terminal of availability for each subband or LBT success/failure for the subband, and it may be expressed as bitmap information.

Figure 14:
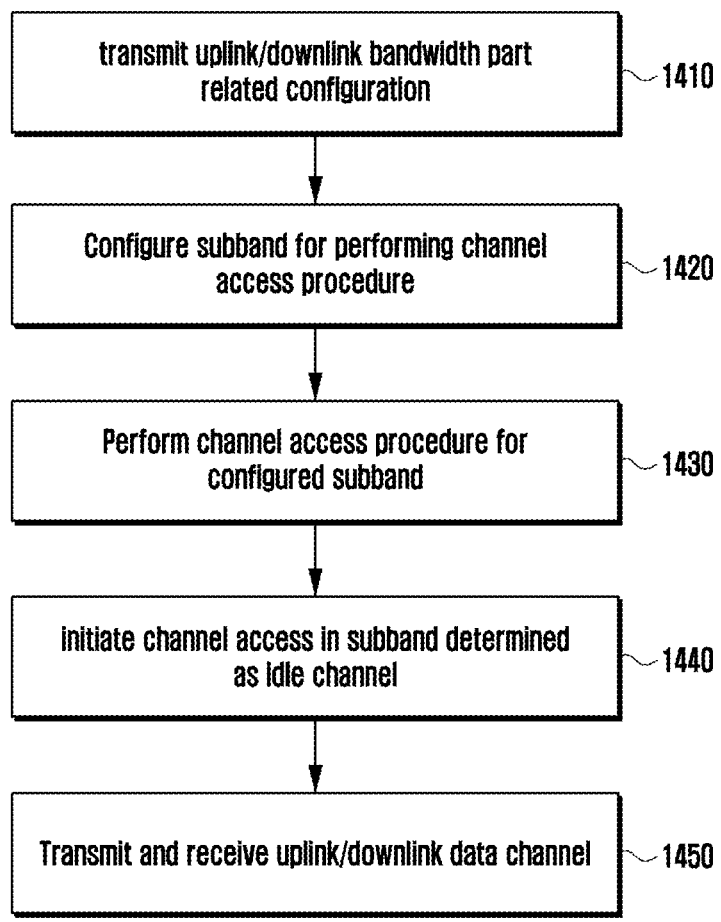
FIG. 14 illustrates a flowchart of the operation of a base station in a wireless communication system according to various embodiments of the disclosure.

FIG. 14 illustrates a flowchart of the operation of a base station in a wireless communication system according to various embodiments of the disclosure.

FIG. 14 exemplifies an operation method of a base station 110. With reference to FIG. 14, at operation 1410, the base station may configure uplink/downlink bandwidth part for performing communication with a terminal, and it may transmit configuration information related to the bandwidth part, for example, configuration information including information on a bandwidth and subcarrier spacing, to the terminal.

For example, the base station may configure the bandwidth part for performing the communication with the terminal through a unlicensed band, and the configuration information may include information indicating the configured bandwidth part.

Further, at operation 1410, the base station may configure a variable value related to transmission/reception of the uplink/downlink data channel to the terminal, and the configuration information may include the variable value related to the transmission/reception of the uplink/downlink data channel. The configuration information may be transmitted through higher layer signaling. For example, if the configured bandwidth part is larger than one channel (e.g., 20 MHz) in the unlicensed band, the terminal may determine that the base station divides the bandwidth part into subbands and it performs the channel access procedure for the respective subbands. In this case, the terminal may be additionally configured with whether the base station is to perform the channel access procedure for the respective subbands or whether to perform the channel access procedure for the whole bandwidth part without separate division of the subbands. If the base station performs the channel access procedure for the whole bandwidth part without subband division, operation 1430 may be omitted.

At operation 1420, the base station may transmit subband configuration information to the terminal. The base station may configure the bandwidth part composed of one or more subbands through various embodiments and methods of the disclosure. In this case, the subband configuration information may include at least one of a subband size, subband start frequency information, or inter-subband offset information, and the base station may transmit the configuration information to the terminal through higher layer signaling. In this case, the higher layer signaling may include an SIB or RRC message, and information transmitted at operations 1410 and 1420 may be included in one message or in separate messages to be transmitted. The detailed subband configuration method is the same as that as described above, and the description thereof will be omitted.

At operation 1430, the base station may perform the channel access procedure for the respective subbands included in the bandwidth part.

At operation 1440, the base station may initiate (or start) the channel access through one or more subbands among the subbands determined as the idle channels in accordance with the result of the channel access procedure.

At operation 1450, the base station may schedule the terminal with the uplink or downlink data channel in accordance with the result of the channel access procedure for the respective subbands. Also, it may transmit and receive the downlink data or the uplink data. In this case, the base station may schedule the terminal with the uplink or downlink data channel in accordance with the above-described method.

Further, among the contents described in embodiment 1 to embodiment 3, it is apparent to be able to combine and apply the contents omitted in the drawings within a range that does not spoil the subject matter of the disclosure.

Figure 15:
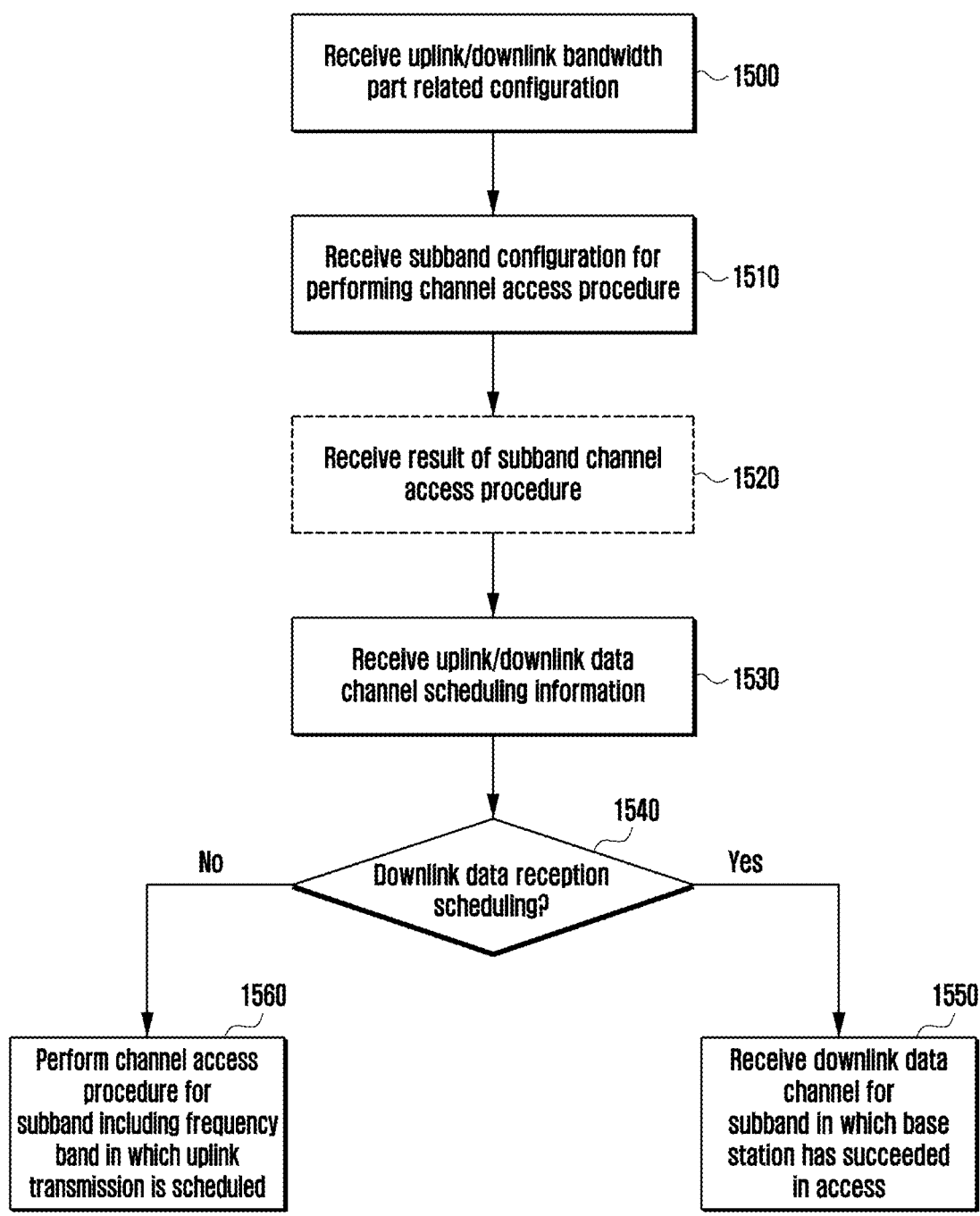
FIG. 15 illustrates a flowchart of the operation of a terminal in a wireless communication system according to various embodiments of the disclosure.

FIG. 15 illustrates a flowchart of the operation of a terminal in a wireless communication system according to various embodiments of the disclosure.

With reference to FIG. 15, at operation 1500, a terminal may receive configuration information including bandwidth part configuration from a base station. For example, the terminal may be configured with the bandwidth part to perform communication with the base station, and the configuration information may include information indicating the configured bandwidth part.

Further, at operation 1500, the terminal may be configured with a variable value related to transmission/reception of the uplink/downlink data channel, and the configuration information may include the variable value related to the transmission/reception of the uplink/downlink data channel. The configuration information may be transmitted through higher layer signaling. For example, if the configured bandwidth part is larger than one channel (e.g., 20 MHz) in the unlicensed band, the terminal may determine that the base station divides the bandwidth part into subbands, and it performs the channel access procedure for the respective subbands. In this case, the terminal may be additionally configured with whether the base station is to perform the channel access procedure for the respective subbands or whether to perform the channel access procedure for the whole bandwidth part without separate division of the subbands. If the base station performs the channel access procedure for the whole bandwidth part without subband division, operation 1520 may be omitted.

At operation 1510, the terminal may receive subband configuration information configured by the base station through various embodiments and methods of the disclosure from the base station through a higher signal. For example, the configuration information may include at least one piece of information among information of a subband size, subband start frequency information, or inter-subband offset. Through this, the terminal may identify the subband to perform the channel access procedure for uplink signal transmission. The detailed subband configuration method is the same as that as described above, and the description thereof will be omitted.

At operation 1520, the terminal may receive the result of the channel access for the respective subbands from the base station. For example, in the case where the base station performs the channel access procedure through dividing of the bandwidth part into the subbands, the terminal may receive the result of the channel access procedure for the respective subbands from the base station. The result of the channel access procedure may be received, for example, through the DCI. In this case, operation 1520 may be omitted.

At operation 1530, the terminal may receive the DCI for scheduling the uplink/downlink data channel transmission and reception from the base station.

At operation 1540, the terminal may determine whether the DCI received from the base station at operation 1530 is the DCI for scheduling the downlink data channel or downlink control signal reception or the DCI for scheduling the uplink data channel transmission or uplink control signal transmission.

At operation 1540, if it is determined that the DCI received at operation 1530 is the DCI for scheduling the downlink data channel or downlink control signal reception, the terminal, at operation 1550, may receive the downlink data channel or downlink control signal in accordance with the received DCI. In this case, the terminal having received the result of the subband channel access procedure at operation 1520 may receive the downlink data channel or downlink control signal using the scheduling DCI and the result of the subband channel access procedure.

At operation 1540, if it is determined that the DCI received at operation 1530 is the DCI for scheduling the uplink data channel or uplink control signal transmission, the terminal, at operation 1560, may transmit the uplink data channel or uplink control signal in accordance with the received DCI. In this case, the terminal may perform the channel access procedure for the subband including the whole uplink signal transmission frequency resource region scheduled through at least the DCI among the subbands constructed or configured at operation 1510. In this case, regardless of the frequency resource region for transmitting the uplink signal scheduled with the DCI, the terminal may perform the channel access procedure for all the subbands constituting the whole configured bandwidth part, and it may transmit the signal only with respect to the frequency resource region included in the subband determined to be in an idle state. Further, among the contents described in embodiment 1 to embodiment 3, it is apparent to be able to combine and apply the contents omitted in the drawings within a range that does not spoil the subject matter of the disclosure.

Figure 16:
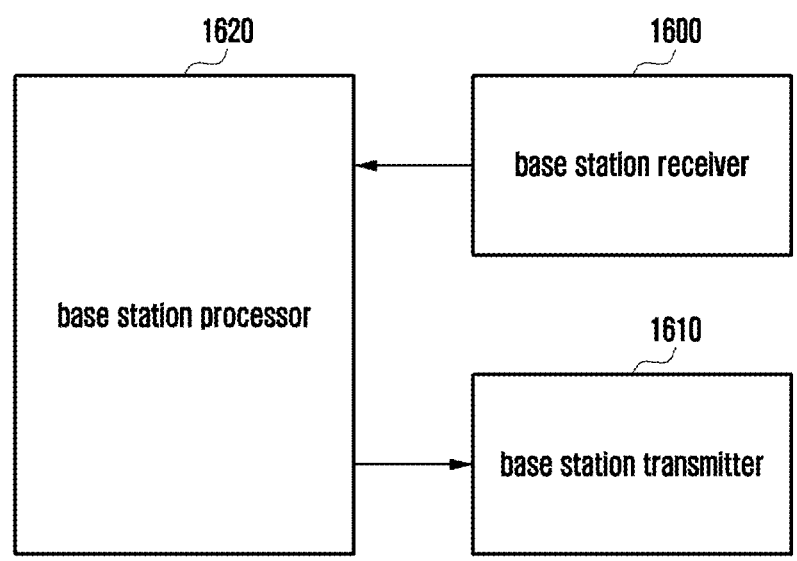
FIG. 16 illustrates a diagram of the internal structure of a base station in a wireless communication system according to various embodiments of the disclosure.

FIG. 16 illustrates a diagram of the internal structure of a base station in a wireless communication system according to various embodiments of the disclosure.

With reference to FIG. 16, a base station according to the disclosure may include a base station receiver 1600, a base station transmitter 1610, and a base station processor 1620. In accordance with the above-described communication method by the base station, the base station receiver 1600, the base station transmitter 1610, and the base station processor 1620 may operate.

However, constituent elements of the base station are not limited to the above-described example. The base station may include more constituent elements than the above-described constituent elements, or may include less constituent elements than the above-described constituent elements. For example, the base station receiver 1600 and the base station transmitter 1610 may be implemented by a transceiver.

According to another example, the base station may further include a memory. In addition, the processor, the transceiver, and the memory of the base station may be implemented in the form of one chip. Further, at least one processor may be provided. In an embodiment, the processor and the base station processor 1620 may be used as the same meaning.

The base station receiver 1600 and the base station transmitter 1610 may be commonly called the transceiver capable of transmitting and receiving signals to and from a terminal. A signal being transmitted and received to and from the terminal may include control information and data. The transceiver may include an RF transmitter up-converting and amplifying a frequency of a transmitted signal and an RF receiver low-noise-amplifying the received signal and down-converting the frequency of the amplified signal. However, the transceiver is merely exemplary, and the constituent elements of the transceiver are not limited to the RF transmitter and the RF receiver. Further, the transceiver may receive the signal through a radio channel, output the signal to the base station processor 1620, and transmit the signal output from the base station processor 1620 through the radio channel.

The base station processor 1620 may control a series of processes so that the base station can operate according to the embodiments of the disclosure as described above. For example, the transceiver may receive a data signal including a control signal transmitted by the terminal, and the base station processor 1620 may determine the reception result for the control signal and the data signal transmitted by the terminal. Further, the base station processor 1620 may perform the channel access procedure for the unlicensed band. For example, the transceiver may receive signals being transmitted using the unlicensed band, and the base station processor 1620 may predefine the strength of the received signal, or may determine whether the unlicensed band is in an idle state through comparison of the bandwidth with a threshold value determined as a function value. Further, the base station processor 1620 may maintain or change the contention window value for the channel access procedure in accordance with the result of receiving the data signal of the terminal received by the transceiver. If it is determined that the unlicensed band is in an idle state, it is possible to transmit a downlink signal including slot format indicator information through the transceiver. In this case, the transceiver may include and transmit to the terminal information on the uplink or downlink transmission interval in the channel occupancy interval of the unlicensed band determined by the base station processor 1620. Further, the base station processor 1620 may receive a PUSCH transmitted by the terminal through the base station receiver 1600 in a PUSCH transmission resource region determined in accordance with the slot format indicator information and PDSCH/PUSCH scheduling information.

Further, the base station processor 1620 may control the transceiver and the memory (not illustrated) to transmit configuration information on the PDCCH to the terminal through execution of a program for indicating the channel occupancy time stored in the memory (not illustrated), to perform the channel access procedure for channel occupancy of the unlicensed band, and to provide slot format indicator information for at least one slot through the channel occupancy time occupied through the channel access procedure based on the PDCCH configuration information. In addition, the base station processor 1620 may control other elements of the base station to perform the above-described method for indicating the channel occupancy time.

The memory (not illustrated) may store the program and data required for the operation of the base station. Further, the memory (not illustrated) may store control information or data included in the signal acquired by the base station. The memory (not illustrated) may be composed of storage media, such as ROM, RAM, hard disk, CD-ROM, and DVD, or a combination of the storage media.

In various embodiments, the base station receiver 1600 and the base station transmitter 1610 may be included in the wireless transceiver 210, and the base station processor 1620 may be included in the controller 240.

Figure 17:
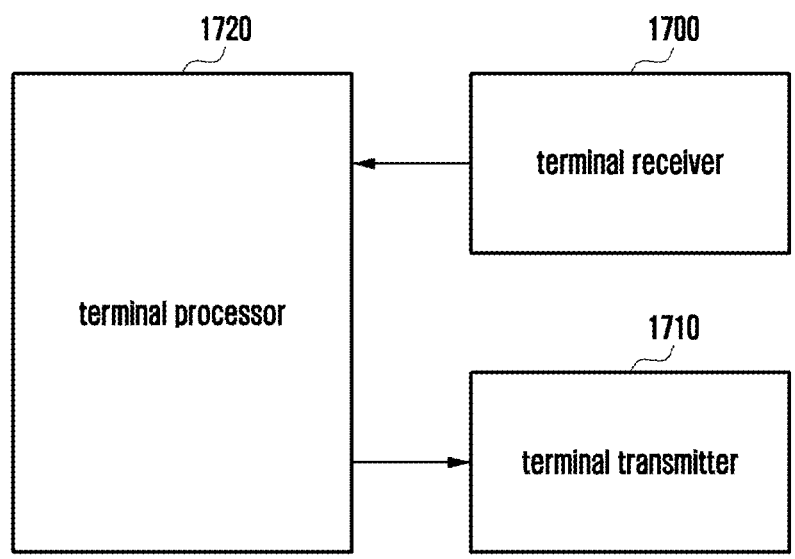
FIG. 17 illustrates a diagram of the internal structure of a terminal in a wireless communication system according to various embodiments of the disclosure.

FIG. 17 illustrates a diagram of the internal structure of a terminal in a wireless communication system according to various embodiments of the disclosure.

As illustrated in FIG. 17, a terminal according to the disclosure may include a terminal receiver 1700, a terminal transceiver 1710, and a terminal processor 1720. In accordance with the above-described communication method by the terminal, the terminal receiver 1700, the terminal transmitter 1710, and the terminal processor 1720 may operate.

However, constituent elements of the terminal are not limited to the above-described example. The terminal may include more constituent elements than the above-described constituent elements, or may include less constituent elements than the above-described constituent elements. For example, the terminal receiver 1700 and the terminal transmitter 1710 may be implemented by a transceiver. According to another example, the terminal may further include a memory. In addition, the processor, the transceiver, and the memory 1710 of the terminal may be implemented in the form of one chip. Further, at least one processor may be provided. In an embodiment, the processor and the terminal processor 1720 may be used as the same meaning.

The terminal receiver 1700 and the terminal transmitter 1710 may be commonly called the transceiver capable of transmitting and receiving signals to and from a base station. A signal being transmitted and received to and from the base station may include control information and data. For this, the transceiver may include an RF transmitter up-converting and amplifying a frequency of a transmitted signal and an RF receiver low-noise-amplifying the received signal and down-converting the frequency of the amplified signal. However, the transceiver is merely exemplary, and the constituent elements of the transceiver are not limited to the RF transmitter and the RF receiver.

Further, the transceiver may receive the signal through a radio channel, output the signal to the terminal processor 1720, and transmit the signal output from the terminal processor 1720 through the radio channel. The terminal processor 1720 may control a series of processes so that the terminal can operate according to the embodiments of the disclosure as described above. For example, the transceiver may receive a data signal including a control signal, and the terminal processor 1720 may determine the reception result of the data signal. Thereafter, if it is required to transmit the reception result of a first signal including data reception in the timing to the base station, the transceiver transmits the reception result of the first signal to the base station in the timing determined by the terminal processor 1720. Further, if the transceiver receives information on the uplink or downlink transmission interval in the channel occupancy interval of the unlicensed band from the base station, the terminal processor 1720 may reconfigure or change the downlink control channel transmission time or period of the terminal, or the terminal may reconfigure or change the time domain allocation information of the scheduled uplink data channel, and accordingly, the terminal receiver 1700 may receive the downlink control channel transmitted by the base station. Further, the terminal processor 1720 may receive the reception result of the uplink data transmitted from the transceiver to the base station, and the terminal processor 1720 may maintain or change the contention window size that is used in the channel access procedure for the unlicensed band signal transmission in accordance with the received result. Further, the terminal processor 1720 may receive the slot format indicator information transmitted by the base station from the transceiver, and the terminal processor 1720 may reconfigure or change the time domain allocation information of the scheduled uplink data channel in accordance with the received slot format indicator information.

Further, the terminal processor 1720 may perform a series of operations for receiving additional information, such as slot format information configuration, slot format information providing, offset information, and effective slot information, from the base station according to an embodiment of the disclosure, and acquiring the slot format information based on the received information. That is, the processor 1720 may control other constituent elements of the terminal to perform higher signal reception, SFI reception, DCI reception, and channel access procedure.

Further, the terminal processor 1720 may receive, from the base station, one or more pieces of configuration information that means the result of the channel access procedure for the respective subbands according to an embodiment of the disclosure. Further, the terminal processor 1720 may correctly schedule and receive uplink/downlink data channel through the transceiver using the result of the configured channel access procedure according to an embodiment of the disclosure.

Further, by executing a program for acquiring the channel occupancy time information stored in the memory, the terminal processor 1720 may control the transceiver and the memory (not illustrated) to receive a PDCCH based on the configuration information for the PDCCH from the base station, to acquire the slot format indicator information in the received PDCCH, and to determine at least one of the maximum channel occupancy time of the base station and the channel occupancy time based on the slot format indicator information. In addition, the terminal processor 1720 may control other elements of the terminal to perform the above-described method for acquiring the above-described channel occupancy time information.

The memory (not illustrated) may store the program and data required for the operation of the terminal. Further, the memory (not illustrated) may store control information or data included in the signal acquired by the terminal. The memory (not illustrated) may be composed of storage media, such as ROM, RAM, hard disk, CD-ROM, and DVD, or a combination of the storage media.

In various embodiments, the terminal receiver 1700 and the terminal transmitter 1710 may be included in the transceiver 310, and the terminal processor 1720 may be included in the controller 330.

In a wireless communication system according to the disclosure, the terminal includes receiving configuration information of a bandwidth part from a base station; receiving subband configuration information from the base station; receiving control information including a result of a channel access procedure performed for each subband and resource allocation information; and receiving data based on the result of the channel access procedure and the resource allocation information. Further, the subband configuration information includes at least one of information on a size of the subband or frequency information of the subband. Further, the information on the size of the subband includes information on a reference size of the subband or a size of the bandwidth part, and the size of the subband determined based on a reference subcarrier spacing or a subcarrier spacing of the bandwidth part. Further, the frequency information of the subband includes at least one of an offset value between a reference point and a frequency start location of the subband, an offset value between the reference point and a frequency start location of the bandwidth part, or an offset value between plural subbands. Further, the reference point is acquired based on a synchronization signal block, and the offset value is determined in the unit of a physical resource block or a subcarrier. Further, if the resource is included in an offset duration of the subband in which the channel access procedure has failed, data is not received on the resource.

The methods according to claims of the disclosure and embodiments described in the description may be implemented in the form of hardware, software, or a combination of hardware and software.

In the case of implementing by software, a computer readable storage medium storing one or more programs (software modules) may be provided. One or more programs stored in the computer readable storage medium are configured for execution by one or more processors in an electronic device. The one or more programs include instructions that cause the electronic device to execute the methods according to the claims of the disclosure or embodiments described in the description.

Such a program (software module or software) may be stored in a nonvolatile memory including a random access memory and a flash memory, a read only memory (ROM), an electrically erasable programmable read only memory (EEPROM), a magnetic disc storage device, a compact disc-ROM (CD-ROM), a digital versatile discs (DVDs) or other types of optical storage devices, or a magnetic cassette. Further, the program may be stored in a memory composed of a combination of parts or the whole of them. Further, a plurality of memories may be included.

Further, the program may be stored in an attachable storage device that can be accessed through a communication network such as Internet, Intranet, local area network (LAN), wide LAN (WLAN), or storage area network (SAN) or a communication network composed of a combination thereof. The storage device may be accessed by a device that performs embodiments of the disclosure through an external port. Further, a separate storage device on the communication network may access a device that performs embodiments of the disclosure.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form. The embodiments described in this specification have been individually described, but two or more of the embodiments may be combined and practiced.

The embodiments of the disclosure and the terms used in the embodiments of the disclosure and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context.

Operations performed by a module, a program or other elements according to various embodiments may be executed sequentially, in parallel, repeatedly, or heuristically, or at least some operations may be executed in different order or may be omitted, or other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
   receiving, from a base station, configuration information via radio resource control (RRC) signaling;
   identifying whether information on a guardband is included in the configuration information;
   receiving, from the base station, control information including bitmap information indicating an available resource block (RB) set among RB sets, wherein the RB sets are determined based on the information on the guardband that is included in the configuration information; and
   receiving, from the base station, data based on the bitmap information.

2. The method of claim 1, wherein the information on the guardband includes information on a size of the guardband and a start RB index of the guardband.

3. The method of claim 1, wherein, based on the information on the guardband being not included in the configuration information, the guardband is determined based on a predetermined guardband.

4. The method of claim 1, wherein each of the RB sets is separated based on the guardband in a bandwidth part.

5. The method of claim 1, wherein the information on the guardband is configured for at least one subcarrier spacing.

6. A method performed by a base station in a communication system, the method comprising:
   transmitting, to a terminal, configuration information via radio resource control (RRC) signaling;
   transmitting, to the terminal, control information including bitmap information indicating an available resource block (RB) set among RB sets, wherein the RB sets are determined based on information on a guardband that is included in the configuration information; and
   transmitting, to the terminal, data based on the bitmap information.

7. The method of claim 6, wherein the information on the guardband includes information on a size of the guardband and a start RB index of the guardband.

8. The method of claim 6, wherein, based on the information on the guardband being not included in the configuration information, the guardband is determined based on a predetermined guardband.

9. The method of claim 6, wherein each of the RB sets is separated based on the guardband in a bandwidth part.

10. The method of claim 6, wherein the information on the guardband is configured for at least one subcarrier spacing.

11. A terminal in a communication system, the terminal comprising:
    a transceiver; and
    a controller coupled with the transceiver and configured to:
       receive, from a base station, configuration information via radio resource control (RRC) signaling,
       identify whether information on a guardband is included in the configuration information,
       receive, from the base station, control information including bitmap information indicating an available resource block (RB) set among RB sets, wherein the RB sets are determined based on the information on the guardband that is included in the configuration information, and
       receive, from the base station, data based on the bitmap information.

12. The terminal of claim 11, wherein the information on the guardband includes information on a size of the guardband and a start RB index of the guardband.

13. The terminal of claim 11, wherein, based on the information on the guardband being not included in the configuration information, the guardband is determined based on a predetermined guardband.

14. The terminal of claim 11, wherein each of the RB sets is separated based on the guardband in a bandwidth part.

15. The terminal of claim 11, wherein the information on the guardband is configured for at least one subcarrier spacing.

16. A base station in a communication system, the base station comprising:
    a transceiver; and
    a controller coupled with the transceiver and configured to:
       transmit, to a terminal, configuration information via radio resource control (RRC) signaling,
       transmit, to the terminal, control information including bitmap information indicating an available resource block (RB) set among RB sets, wherein the RB sets are determined based on information on a guardband that is included in the configuration information, and
       transmit, to the terminal, data based on the bitmap information.

17. The base station of claim 16, wherein the information on the guardband includes information on a size of the guardband and a start RB index of the guardband.

18. The base station of claim 16, wherein, based on the information on the guardband being not included in the configuration information, the guardband is determined based on a predetermined guardband.

19. The base station of claim 18, wherein each of the RB sets is separated based on the guardband in a bandwidth part.

20. The base station of claim 16, wherein the information on the guardband is configured for at least one subcarrier spacing.

* * * * *